US012571992B2

(12) United States Patent
Jang et al.

(10) Patent No.: US 12,571,992 B2
(45) Date of Patent: Mar. 10, 2026

(54) OPTICAL IMAGING SYSTEM

(71) Applicant: Samsung Electro-Mechanics Co., Ltd., Suwon-si (KR)

(72) Inventors: Dong Hyuk Jang, Suwon-si (KR); Byung Hyun Kim, Suwon-si (KR); Jae Hyuk Huh, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 992 days.

(21) Appl. No.: 17/234,057

(22) Filed: Apr. 19, 2021

(65) Prior Publication Data

US 2022/0171162 A1 Jun. 2, 2022

(30) Foreign Application Priority Data

Nov. 30, 2020 (KR) ........................ 10-2020-0164581

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............. G02B 13/18; G02B 13/0015; G02B 13/0045; G02B 9/64; G02B 2003/0093; G03B 30/00
USPC .................................................. 359/754, 692
See application file for complete search history.

(56) References Cited

U.S. PATENT DOCUMENTS

| | | | |
|---|---|---|---|
| 11,016,272 | B2 | 5/2021 | Hirano |
| 11,619,803 | B2 | 4/2023 | Hirano |
| 12,117,670 | B2 | 10/2024 | Hirano |
| 2007/0115561 | A1 | 5/2007 | Chuang et al. |
| 2009/0273851 | A1 | 11/2009 | Take et al. |

(Continued)

FOREIGN PATENT DOCUMENTS

| | | |
|---|---|---|
| CN | 101510000 A | 8/2009 |
| CN | 105988187 A | 10/2016 |

(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007) (Year: 2007).*

(Continued)

*Primary Examiner* — Collin X Beatty
*Assistant Examiner* — Jennifer A Jones
(74) *Attorney, Agent, or Firm* — NSIP Law

(57) ABSTRACT

An optical imaging system includes a first lens, a second lens, a third lens, a fourth lens, a fifth lens, a sixth lens, a seventh lens, an eighth lens, and a ninth lens sequentially arranged from an object side, wherein the first lens has positive refractive power, the second lens has negative refractive power and a refractive index higher than 1.6, any one of the third lens and the fourth lens has a refractive index higher than 1.6, the sixth lens has negative refractive power and a refractive index higher than 1.6, and TTL/(2*IMG HT)<0.61, where TTL is a distance on an optical axis from an object-side surface of the first lens to an imaging plane, and IMG HT is half a diagonal length of the imaging plane.

17 Claims, 12 Drawing Sheets

(56) References Cited

U.S. PATENT DOCUMENTS

| | | | |
|---|---|---|---|
| 2013/0141804 A1 | 6/2013 | Liu et al. | |
| 2013/0293767 A1 | 11/2013 | Imaoka et al. | |
| 2014/0184882 A1 | 7/2014 | Kuzuhara et al. | |
| 2017/0293117 A1 | 10/2017 | Katou et al. | |
| 2017/0307858 A1 | 10/2017 | Chen | |
| 2019/0004296 A1 | 1/2019 | Sugita | |
| 2020/0209593 A1 | 7/2020 | Hirano | |
| 2020/0209594 A1 | 7/2020 | Hirano | |
| 2020/0241243 A1* | 7/2020 | Hirano | G02B 9/64 |
| 2020/0249437 A1 | 8/2020 | Hirano | |
| 2020/0271898 A1 | 8/2020 | Hirano | |
| 2020/0285028 A1 | 9/2020 | Hirano | |
| 2020/0393652 A1 | 12/2020 | Kuo | |
| 2020/0393653 A1 | 12/2020 | Chen | |
| 2021/0278636 A1* | 9/2021 | Lin | G02B 13/0045 |
| 2021/0382281 A1 | 12/2021 | Huang et al. | |
| 2022/0066147 A1 | 3/2022 | Liu | |
| 2022/0066148 A1 | 3/2022 | Zhao | |
| 2022/0066160 A1* | 3/2022 | Meng | G02B 13/06 |
| 2022/0066161 A1 | 3/2022 | Sun | |
| 2022/0066162 A1* | 3/2022 | Guo | G02B 13/0045 |
| 2022/0075145 A1 | 3/2022 | Li | |
| 2022/0075149 A1* | 3/2022 | Chen | G02B 13/18 |
| 2022/0146793 A1* | 5/2022 | Zhou | G02B 9/64 |

FOREIGN PATENT DOCUMENTS

| | | |
|---|---|---|
| CN | 110320645 A | 10/2019 |
| CN | 111427134 A | 7/2020 |
| CN | 111443465 A | 7/2020 |
| CN | 210924090 U | 7/2020 |
| CN | 111487748 A | 8/2020 |
| CN | 111596442 A | 8/2020 |
| CN | 111610615 A | 9/2020 |
| CN | 111665611 A | 9/2020 |
| CN | 111766686 A | 10/2020 |
| CN | 111766688 A | 10/2020 |
| CN | 111812810 A | 10/2020 |
| CN | 111812811 A | 10/2020 |
| CN | 111812814 A | 10/2020 |
| CN | 111812816 A | 10/2020 |
| JP | 2010-204621 A | 9/2010 |
| JP | 2020-109436 A | 7/2020 |
| JP | 2020-118922 A | 8/2020 |
| JP | 2020-126183 A | 8/2020 |
| JP | 2020-144314 A | 9/2020 |
| TW | 200720696 A | 6/2007 |
| TW | 201323975 A1 | 6/2013 |
| TW | 201719235 A | 6/2017 |
| TW | 201802518 A | 1/2018 |
| TW | I684807 B | 2/2020 |
| TW | I691751 B | 4/2020 |
| TW | M600398 U | 8/2020 |

OTHER PUBLICATIONS

Korean Office Action issued on Sep. 16, 2022, in counterpart Korean Patent Application No. 10-2020-0164581 (6 pages in English, 5 pages in Korean).

Chinese Office Action issued on Nov. 24, 2022, in counterpart Chinese Patent Application No. 202210424820.8 (7 pages in English, 9 pages in Chinese).

Taiwanese Office Action issued on Nov. 14, 2022, in counterpart Taiwanese Patent Application No. 111127239 (5 Pages in Chinese, 4 Pages in English).

Taiwanese Office Action issued on Sep. 24, 2021, in counterpart Taiwanese Patent Application No. 110115561 (4 pages in English and 4 pages in Mandarin).

Chinese Office Action issued on Sep. 7, 2022, in counterpart Chinese Patent Application No. 202110810614.6 (7 pages in English and 10 pages in Chinese).

Korean Office Action issued on Nov. 8, 2023, in counterpart Korean Patent Application No. 10-2023-0081426 (9 pages in English, 6 pages in Korean).

Taiwanese Office Action issued on Jan. 10, 2024, in counterpart Taiwanese Patent Application No. 112134906 (4 pages in English, 5 pages in Chinese).

Taiwanese Office Action Issued on Dec. 13, 2024, in Counterpart Taiwanese Patent Application No. 113143556 (6 Pages in English, 5 Pages in Chinese).

Chinese Office Action Issued on Apr. 30, 2025, in Counterpart Chinese Patent Application No. 202310097597.5 (4 Pages in English, 7 Pages in Chinese).

Taiwanese Office Action issued on Jan. 8, 2026, in counterpart Taiwanese Patent Application No. 114143894. (7 pages in English, 7 pages in Taiwanese).

* cited by examiner

OPTICAL IMAGING SYSTEM

CROSS-REFERENCE TO RELATED APPLICATIONS

This application claims the benefit under 35 USC 119(a) of Korean Patent Application No. 10-2020-0164581 filed on Nov. 30, 2020, in the Korean Intellectual Property Office, the entire disclosure of which is incorporated herein by reference for all purposes.

BACKGROUND

1. Field

The present disclosure relates to an optical imaging system.

2. Description of the Background

Recently, mobile terminals are provided with camera modules including optical imaging systems including plural lenses to enable video calling and image capturing.

In addition, as a level of functionality of camera modules in mobile terminals has gradually increased, camera modules for mobile terminals have gradually been required to have higher resolution than previous camera modules.

Furthermore, mobile terminals have gradually been miniaturized, and camera modules for mobile terminals have thus been required to be slim.

Therefore, there is a need to develop an optical imaging system that is slim and capable of realizing high resolution.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, a seventh lens, an eighth lens, and a ninth lens sequentially arranged from an object side, wherein the first lens has positive refractive power, the second lens has negative refractive power and a refractive index higher than 1.6, any one of the third lens and the fourth lens has a refractive index higher than 1.6, the sixth lens has negative refractive power and a refractive index higher than 1.6, and TTL/(2*IMG HT)<0.61, where TTL is a distance on an optical axis from an object-side surface of the first lens to an imaging plane, and IMG HT is half a diagonal length of the imaging plane.

TTL/$\Sigma$CT may be greater than 2, where $\Sigma$CT is a sum of thicknesses on the optical axis of the first to ninth lenses.

f/f1 may be greater than 0.6 and less than 1.5, where f is an overall focal length of the optical imaging system, and f1 is a focal length of the first lens.

v1−v2 may be greater than 30, where v1 is an Abbe number of the first lens, and v2 is an Abbe number of the second lens.

TTL/f may be greater than 1 and less than 1.25.

n2+n3 may be greater than 3.15, where n2 is a refractive index of the second lens, and n3 is a refractive index of the third lens.

BFL/f may be greater than 0.15 and less than 0.25, where BFL is a distance on the optical axis from an image-side surface of the ninth lens to the imaging plane.

D1/f may be greater than 0.001 and less than 0.04, where D1 is a distance on the optical axis between an image-side surface of the first lens and an object-side surface of the second lens.

R1/f may be greater than 0.3 and less than 0.4, where R1 is a radius of curvature of the object-side surface of the first lens.

Fno may be less than 2.3, where Fno is an f-number of the optical imaging system.

f1/|f2| may be less than 0.34, where f2 is a focal length of the second lens.

The third lens may have positive refractive power.

The fourth lens and the fifth lens may have refractive powers whose signs are opposite to each other, and the seventh lens and the eighth lens may each have positive refractive power and the ninth lens may have negative refractive power.

The third lens and the ninth lens may each have negative refractive power, and the fourth lens, the fifth lens, the seventh lens, and the eighth lens may each have positive refractive power.

In another general aspect, an optical imaging system includes a first lens having positive refractive power, a convex object-side surface, and a concave image-side surface, a second lens having negative refractive power, a convex object-side surface, and a concave image-side surface, a third lens having refractive power, a convex object-side surface, and a concave image-side surface, a fourth lens and a fifth lens each having refractive power, a sixth lens having negative refractive power, a seventh lens and an eighth lens each having positive refractive power, and a ninth lens having negative refractive power, wherein the first to ninth lenses are sequentially arranged from an object side, and wherein TTL/$\Sigma$CT<2, where TTL is a distance on an optical axis from an object-side surface of the first lens to an imaging plane, and $\Sigma$CT is a sum of thicknesses on the optical axis of the first to ninth lenses.

TTL/(2*IMG HT) may be less than 0.61, where IMG HT is half a diagonal length of the imaging plane.

The seventh lens and the eighth lens may each have a convex object-side surface and a concave image-side surface, and the ninth lens may have a concave object-side surface and a concave image-side surface.

The second lens, the sixth lens, and any one of the third lens and the fourth lens may each have a refractive index higher than 1.6.

In another general aspect, an optical imaging system includes a first lens having positive refractive power, a second lens having refractive power, a third lens having refractive power, a convex object-side surface, and a concave image-side surface, a fourth lens and a fifth lens each having refractive power, a sixth lens having negative refractive power, a seventh lens and an eighth lens each having positive refractive power, a convex object-side surface, and a concave image-side surface, and a ninth lens having negative refractive power, a concave object-side surface, and a concave image-side surface, wherein the first to ninth lenses are sequentially arranged from an object side, and wherein 0.6<f/f1<1.5, where f is an overall focal length of the optical imaging system, and f1 is a focal length of the first lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
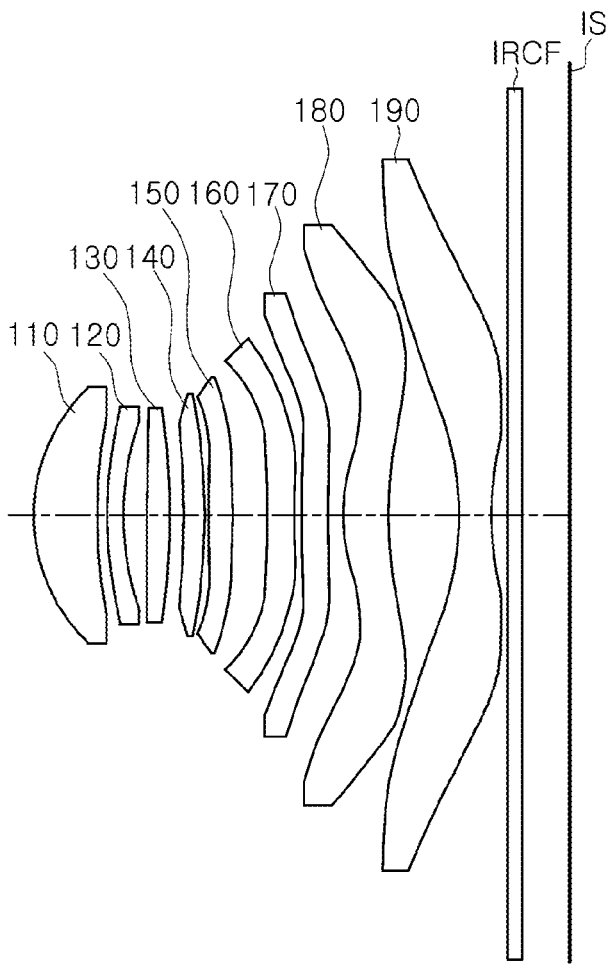
FIG. 1 is a view illustrating an optical imaging system according to a first example embodiment in the present disclosure.

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

In the drawings, thicknesses, sizes, and shapes of lenses have been slightly exaggerated for convenience of explanation. Particularly, shapes of spherical surfaces or aspherical surfaces illustrated in the drawings are illustrated by way of example. That is, the shapes of the spherical surfaces or the aspherical surfaces are not limited to those illustrated in the drawings.

An optical imaging system according to an example embodiment in the present disclosure may include at least nine lenses.

A first lens may refer to a lens closest to an object side, while a final lens may refer to a lens closest to an image sensor.

In addition, a first surface of each lens refers to a surface thereof closest to an object side (or an object-side surface) and a second surface of each lens refers to a surface thereof closest to an image side (or an image-side surface). Further, in the present specification, all numerical values of radii of curvature, thicknesses, distances, and the like, of lenses are indicated by millimeters (mm), and a field of view (FOV) is indicated by degrees.

Further, in a description of a shape of each of the lenses, the meaning that one surface of a lens is convex is that a paraxial region portion of a corresponding surface is convex, the meaning that one surface of a lens is concave is that a paraxial region portion of a corresponding surface is concave, and the meaning that one surface of a lens is planar is that a paraxial region portion of a corresponding surface is planar.

Therefore, although it is described that one surface of a lens is convex, an edge portion of the lens may be concave. Likewise, although it is described that one surface of a lens is concave, an edge portion of the lens may be convex. In addition, although it is described that one surface of a lens is planar, an edge portion of the lens may be convex or concave.

A paraxial region of a lens surface is a central portion of the lens surface surrounding and including an optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

An aspect of the present disclosure may provide an optical imaging system having high resolution while being slim.

An optical imaging system according to an example embodiment in the present disclosure may include at least nine lenses.

For example, the optical imaging system according to the example embodiment may include a first lens, a second lens, a third lens, a fourth lens, a fifth lens, a sixth lens, a seventh lens, an eighth lens, and a ninth lens sequentially disposed in ascending numerical order along the optical axis from an object side of the optical imaging system toward an imaging plane of the optical imaging system. The first to ninth lenses may be arranged to be spaced apart from each other by preset distances along the optical axis.

The optical imaging system according to the example embodiment may further include an image sensor having an imaging surface disposed at the imaging plane of the optical imaging system. The image sensor converts an image of an object formed on an effective imaging area of the imaging surface by the lenses of the optical imaging system into an electrical signal.

Further, the optical imaging system may further include an infrared cut-off filter (hereinafter, referred to as a 'filter') cutting off infrared rays. The filter may be disposed between a last lens and the imaging plane.

In addition, the optical imaging system may further include at least one stop controlling an amount of light. The at least one stop may be disposed before the first lens, or between any two adjacent lenses of the first to ninth lenses, or between the ninth lens and the imaging plane. The optical imaging system may include two or more stops disposed at different locations.

In the optical imaging system according to the example embodiment in the present disclosure, the lenses may be formed of plastic materials.

In addition, all of the lenses may have an aspherical surface. For example, each of the first to ninth lenses may have at least one aspherical surface.

That is, at least one of first and second surfaces of all of the first to ninth lenses may be aspherical. Here, the aspherical surfaces of the first to ninth lenses may be represented by the following Equation 1:

$$Z = \frac{cY^2}{1 + \sqrt{1 - (1+K)c^2Y^2}} + AY^4 + BY^6 + \qquad \text{Equation 1}$$
$$CY^8 + DY^{10} + EY^{12} + FY^{14} + GY^{16} + HY^{18} +$$
$$JY^{20} + LY^{22} + MY^{24} + NY^{26} + OY^{28} + PY^{30} \ldots$$

Here, c is a curvature (an inverse of a radius of curvature) of a lens, K is a conic constant, and Y is a distance from a certain point on an aspherical surface of the lens to an optical axis in a direction perpendicular to the optical axis. In addition, constants A to H, J, and L to P are aspherical coefficients. In addition, Z is a distance between the certain point on the aspherical surface of the lens at the distance Y and a tangential plane meeting the apex of the aspherical surface of the lens.

The optical imaging system including the first to ninth lenses may have positive refractive power/negative refractive power/positive refractive power/negative refractive power/positive refractive power/negative refractive power/positive refractive power/positive refractive power/negative refractive power sequentially from the object side. Alternatively, the optical imaging system including the first to ninth lenses may have positive refractive power/negative refractive power/negative refractive power/positive refractive power/positive refractive power/negative refractive power/positive refractive power/positive refractive power/negative refractive power sequentially from the object side. Alternatively, the optical imaging system including the first to ninth lenses may have positive refractive power/negative refractive power/positive refractive power/positive refractive power/positive refractive power/negative refractive power/negative refractive power/positive refractive power/positive refractive power/negative refractive power sequentially from the object side.

The optical imaging system according to the example embodiment in the present disclosure may satisfy at least one of the following Conditional Expressions:

$$TTL/(2*IMG\ HT)<0.61 \quad \text{(Conditional Expression 1)}$$

$$TTL/\Sigma CT<2 \quad \text{(Conditional Expression 2)}$$

$$0.6<f/f1<1.5 \quad \text{(Conditional Expression 3)}$$

$$v1-v2>30 \quad \text{(Conditional Expression 4)}$$

$$1<TTL/f<1.25 \quad \text{(Conditional Expression 5)}$$

$$n2+n3>3.15 \quad \text{(Conditional Expression 6)}$$

$$0.15<BFL/f<0.25 \quad \text{(Conditional Expression 7)}$$

$$0.001<D1/f<0.04 \quad \text{(Conditional Expression 8)}$$

$$0.3<R1/f<0.4 \quad \text{(Conditional Expression 9)}$$

$$Fno<2.3,\ \text{and} \quad \text{(Conditional Expression 10)}$$

$$f1/|f2|<0.34. \quad \text{(Conditional Expression 11)}$$

Here, f is an overall focal length of the optical imaging system, f1 is a focal length of the first lens, and f2 is a focal length of the second lens.

v1 is an Abbe number of the first lens, and v2 is an Abbe number of the second lens.

TTL is a distance on the optical axis from an object-side surface of a lens (for example, the first lens) disposed closest to the object side to the imaging plane, and BFL is a distance on the optical axis from an image-side surface of a lens (for example, the ninth lens) disposed closest to the image sensor to the imaging plane.

n2 is a refractive index of the second lens, and n3 is a refractive index of the third lens.

R1 is a radius of curvature of the object-side surface of the first lens, D1 is a distance on the optical axis between an image-side surface of the first lens and an object-side surface of the second lens, and ΣCT is the sum of central thicknesses (for example, thicknesses on the optical axis) of respective lenses.

IMG HT is half a diagonal length of the effective imaging area of the imaging surface of the image sensor disposed at the imaging plane of the optical imaging system, and Fno is an f-number of the optical imaging system.

The optical imaging system according to the example embodiment may include first to ninth lenses.

The first lens may have positive refractive power. In addition, the first lens may have a meniscus shape of which an object-side surface is convex. In detail, a first surface of the first lens may be convex, and a second surface thereof may be concave.

At least one of the first and second surfaces of the first lens may be aspherical. For example, both surfaces of the first lens may be aspherical.

The second lens may have negative refractive power. In addition, the second lens may have a meniscus shape of which an object-side surface is convex. In detail, a first surface of the second lens may be convex, and a second surface thereof may be concave.

At least one of the first and second surfaces of the second lens may be aspherical. For example, both surfaces of the second lens may be aspherical.

The third lens may have positive or negative refractive power. In addition, the third lens may have a meniscus shape of which an object-side surface is convex. In detail, a first surface of the third lens may be convex, and a second surface thereof may be concave.

At least one of the first and second surfaces of the third lens may be aspherical. For example, both surfaces of the third lens may be aspherical.

The fourth lens may have positive or negative refractive power. In addition, both surfaces of the fourth lens may be concave. In detail, the first and second surfaces of the fourth lens may be concave.

Alternatively, the fourth lens may have a meniscus shape of which an object-side surface is convex. In detail, a first surface of the fourth lens may be convex, and a second surface thereof may be concave.

At least one of the first and second surfaces of the fourth lens may be aspherical. For example, both surfaces of the fourth lens may be aspherical.

The fifth lens may have positive or negative refractive power. In addition, the fifth lens may have a meniscus shape of which an object-side surface is convex. In detail, a first surface of the fifth lens may be convex in the paraxial region, and a second surface thereof may be concave in the paraxial region.

Alternatively, both surfaces of the fifth lens may be convex. In detail, first and second surfaces of the fifth lens may be convex in the paraxial region.

Alternatively, the fifth lens may have a meniscus shape of which an image-side surface is convex. In detail, a first surface of the fifth lens may be concave in the paraxial region, and a second surface thereof may be convex in the paraxial region.

At least one of the first and second surfaces of the fifth lens may be aspherical. For example, both surfaces of the fifth lens may be aspherical.

At least one inflection point may be formed on at least one of the first and second surfaces of the fifth lens. For example, the first surface of the fifth lens may be convex in the paraxial region and concave in a portion other than the paraxial region. The second surface of the fifth lens may be concave in the paraxial region and convex in a portion other than the paraxial region.

The sixth lens may have negative refractive power. In addition, the sixth lens may have a meniscus shape of which an object-side surface is convex. In detail, a first surface of the sixth lens may be convex in the paraxial region, and a second surface thereof may be concave in the paraxial region.

Alternatively, the sixth lens may have a meniscus shape of which an image-side surface is convex. In detail, a first surface of the sixth lens may be concave in the paraxial region, and a second surface thereof may be convex in the paraxial region.

At least one of the first and second surfaces of the sixth lens may be aspherical. For example, both surfaces of the sixth lens may be aspherical.

At least one inflection point may be formed on at least one of the first and second surfaces of the sixth lens. For example, the first surface of the sixth lens may be convex in the paraxial region and concave in a portion other than the paraxial region. The second surface of the sixth lens may be concave in the paraxial region and convex in a portion other than the paraxial region.

The seventh lens may have positive refractive power. In addition, the seventh lens may have a meniscus shape of which an object-side surface is convex. In detail, a first surface of the seventh lens may be convex in the paraxial region, and a second surface thereof may be concave in the paraxial region.

At least one of the first and second surfaces of the seventh lens may be aspherical. For example, both surfaces of the seventh lens may be aspherical.

In addition, at least one inflection point may be formed on at least one of the first and second surfaces of the seventh lens. For example, the first surface of the seventh lens may be convex in the paraxial region and concave in a portion other than the paraxial region. The second surface of the seventh lens may be concave in the paraxial region and convex in a portion other than the paraxial region.

The eighth lens may have positive refractive power. In addition, the eighth lens may have a meniscus shape of which an object-side surface is convex. In detail, a first surface of the eighth lens may be convex in the paraxial region, and a second surface thereof may be concave in the paraxial region.

At least one of the first and second surfaces of the eighth lens may be aspherical. For example, both surfaces of the eighth lens may be aspherical.

In addition, at least one inflection point may be formed on at least one of the first and second surfaces of the eighth lens. For example, the first surface of the eighth lens may be convex in the paraxial region and concave in a portion other than the paraxial region. The second surface of the eighth lens may be concave in the paraxial region and convex in a portion other than the paraxial region.

The ninth lens may have negative refractive power. In addition, both surfaces of the ninth lens may be concave. In detail, first and second surfaces of the ninth lens may be concave in the paraxial region.

At least one of the first and second surfaces of the ninth lens may be aspherical. For example, both surfaces of the ninth lens may be aspherical.

In addition, at least one inflection point may be formed on at least one of the first and second surfaces of the ninth lens. For example, the first surface of the ninth lens may be concave in the paraxial region and convex in a portion other than the paraxial region. The second surface of the ninth lens may be concave in the paraxial region and convex in a portion other than the paraxial region.

The first lens and the second lens may be formed of plastic materials having different optical characteristics. For example, a refractive index of the second lens may be greater than that of the first lens. As an example, the refractive index of the second lens may be greater than 1.6.

A ratio of a focal length of the first lens to an absolute value of a focal length of the second lens may be less than 0.34.

At least three of a plurality of lenses of the optical imaging system may have a refractive index higher than 1.6.

At least two of the second to fourth lenses may have a refractive index higher than 1.6. For example, the second lens may have a refractive index higher than 1.6, and any one of the third and fourth lenses may have a refractive index higher than 1.6.

At least one of the fifth to eighth lenses may have a refractive index higher than 1.6, and have negative refractive power. As an example, the sixth lens may have a refractive index higher than 1.6, and have negative refractive power.

The optical imaging system according to the example embodiment may be configured to be slim even though it includes at least nine lenses.

In addition, Fno of the optical imaging system is less than 2.3, and the optical imaging system may thus be configured to be bright. In the example embodiment, Fno of the optical imaging system may be 1.8 or more and less than 2.3.

Figure 2:
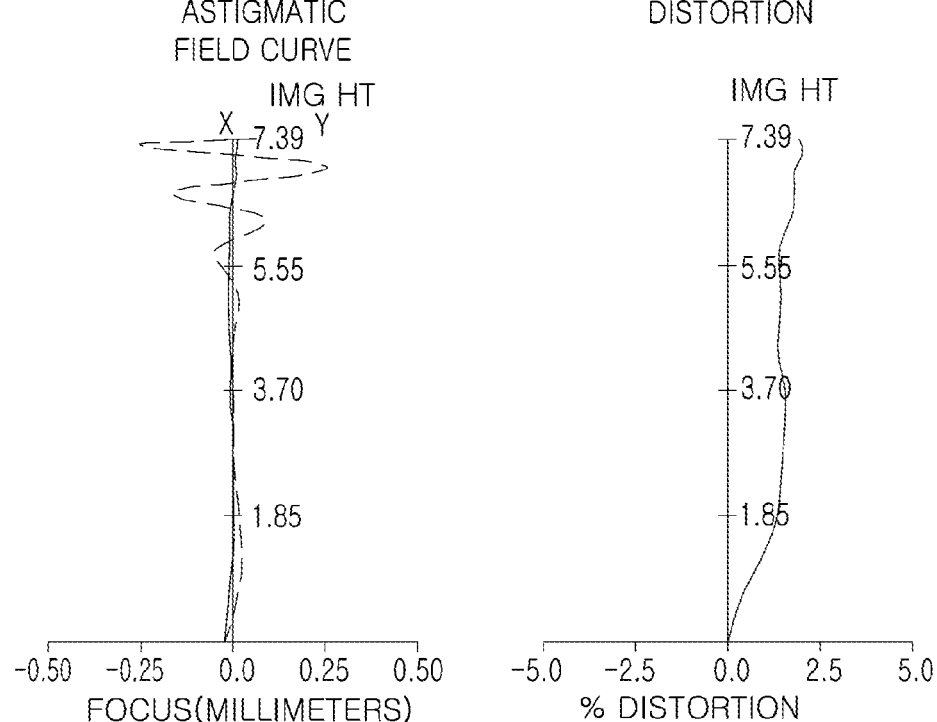
FIG. 2 presents graphs having curves representing aberration characteristics of the optical imaging system illustrated in FIG. 1.

An optical imaging system according to a first example embodiment in the present disclosure will be described with reference to FIGS. 1 and 2.

The optical imaging system according to the first example embodiment may include a first lens 110, a second lens 120, a third lens 130, a fourth lens 140, a fifth lens 150, a sixth lens 160, a seventh lens 170, an eighth lens 180, and a ninth lens 190, and may further include a stop, a filter IRCF, and an image sensor IS.

Characteristics (radii of curvature, thicknesses of lenses or distances between the lenses, refractive indices, Abbe numbers, and focal lengths) of each lens are represented in Table 1.

TABLE 1

| Surface No. | Remark | Radius of Curvature | Thickness or Distance | Refractive Index | Abbe Number | Focal Length |
|---|---|---|---|---|---|---|
| S1 | First Lens | 2.754 | 1.026 | 1.544 | 56.1 | 6.862 |
| S2 | | 9.036 | 0.156 | | | |
| S3 | Second Lens | 11.438 | 0.250 | 1.671 | 19.4 | −21.149 |
| S4 | | 6.302 | 0.367 | | | |
| S5 | Third Lens | 22.800 | 0.351 | 1.535 | 56.1 | 58.075 |
| S6 | | 84.507 | 0.236 | | | |
| S7 | Fourth Lens | −72.785 | 0.300 | 1.671 | 19.4 | −52.880 |
| S8 | | 70.558 | 0.099 | | | |
| S9 | Fifth Lens | 14.866 | 0.353 | 1.544 | 56.1 | 66.313 |
| S10 | | 24.986 | 0.596 | | | |
| S11 | Six Lens | 43.845 | 0.400 | 1.615 | 25.9 | −13.706 |
| S12 | | 7.103 | 0.116 | | | |
| S13 | Seventh Lens | 6.293 | 0.450 | 1.535 | 56.1 | 40.259 |
| S14 | | 8.657 | 0.197 | | | |
| S15 | Eighth Lens | 3.115 | 0.721 | 1.567 | 38.0 | 6.555 |
| S16 | | 17.205 | 1.125 | | | |
| S17 | Ninth Lens | −21.689 | 0.520 | 1.535 | 56.1 | −5.507 |
| S18 | | 3.450 | 0.250 | | | |
| S19 | Filter | Infinity | 0.210 | 1.518 | 64.2 | |
| S20 | | Infinity | 0.767 | | | |
| S21 | Imaging Plane | Infinity | | | | |

Meanwhile, an overall focal length f of the optical imaging system according to the first example embodiment may be 7.14 mm, Fno thereof may be 1.95, and IMG HT thereof may be 7.15 mm.

In the first example embodiment, the first lens 110 may have positive refractive power, and a first surface thereof may be convex while a second surface thereof may be concave.

The second lens 120 may have negative refractive power, and a first surface thereof may be convex while a second surface thereof may be concave.

The third lens 130 may have positive refractive power, and a first surface thereof may be convex while a second surface thereof may be concave.

The fourth lens 140 may have negative refractive power, and a first surface and a second surface thereof may be concave.

The fifth lens 150 may have positive refractive power, and a first surface thereof may be convex in the paraxial region and a second surface thereof may be concave in the paraxial region.

In addition, at least one inflection point may be formed on at least one of the first and second surfaces of the fifth lens 150. For example, the first surface of the fifth lens 150 may be convex in the paraxial region and concave in a portion other than the paraxial region. The second surface of the fifth lens 150 may be concave in the paraxial region and convex in a portion other than the paraxial region.

The sixth lens 160 may have negative refractive power, and a first surface thereof may be convex in the paraxial region and a second surface thereof may be concave in the paraxial region.

In addition, at least one inflection point may be formed on at least one of the first and second surfaces of the sixth lens 160. For example, the first surface of the sixth lens 160 may be convex in the paraxial region and concave in a portion other than the paraxial region. The second surface of the sixth lens 160 may be concave in the paraxial region and convex in a portion other than the paraxial region.

The seventh lens 170 may have positive refractive power, and a first surface thereof may be convex in the paraxial region and a second surface thereof may be concave in the paraxial region.

In addition, at least one inflection point may be formed on at least one of the first and second surfaces of the seventh lens 170. For example, the first surface of the seventh lens 170 may be convex in the paraxial region and concave in a portion other than the paraxial region. The second surface of the seventh lens 170 may be concave in the paraxial region and convex in a portion other than the paraxial region.

The eighth lens 180 may have positive refractive power, and a first surface thereof may be convex in the paraxial region and a second surface thereof may be concave in the paraxial region.

In addition, at least one inflection point may be formed on at least one of the first and second surfaces of the eighth lens 180. For example, the first surface of the eighth lens 180 may be convex in the paraxial region and concave in a portion other than the paraxial region. The second surface of the eighth lens 180 may be concave in the paraxial region and convex in a portion other than the paraxial region.

The ninth lens 190 may have negative refractive power, and a first surface and a second surface thereof may be concave in the paraxial region.

In addition, at least one inflection point may be formed on at least one of the first and second surfaces of the ninth lens 190. For example, the first surface of the ninth lens 190 may be concave in the paraxial region and convex in a portion other than the paraxial region. The second surface of the ninth lens 190 may be concave in the paraxial region and convex in a portion other than the paraxial region.

Meanwhile, respective surfaces of the first to ninth lenses 110 to 190 may have aspherical coefficients as represented in Table 2. For example, all of object-side surfaces and image-side surfaces of the first to ninth lenses 110 to 190 may be aspherical.

TABLE 2

|   | S1 | S2 | S3 | S4 | S5 | S6 |
|---|---|---|---|---|---|---|
| K | −9.953E−01 | 7.019E+00 | 3.149E+01 | 6.781E+00 | 9.852E+01 | 9.900E+01 |
| A | 4.782E−03 | −1.157E−02 | −1.472E−02 | −7.655E−03 | −1.415E−02 | −1.275E−02 |
| B | 9.603E−03 | 3.860E−03 | −6.147E−03 | 7.127E−03 | 2.542E−03 | −1.292E−02 |
| C | −3.034E−02 | −3.169E−05 | 8.026E−02 | 2.419E−03 | −6.202E−03 | 6.179E−02 |
| D | 6.187E−02 | −7.384E−03 | −2.542E−01 | 1.201E−02 | 7.130E−03 | −1.909E−01 |
| E | −8.339E−02 | 1.743E−02 | 5.203E−01 | −7.581E−02 | 6.830E−03 | 3.840E−01 |
| F | 7.775E−02 | −2.270E−02 | −7.389E−01 | 1.738E−01 | −4.724E−02 | −5.314E−01 |
| G | −5.155E−02 | 1.915E−02 | 7.465E−01 | −2.327E−01 | 9.668E−02 | 5.206E−01 |
| H | 2.464E−02 | −1.110E−02 | −5.432E−01 | 2.028E−01 | −1.149E−01 | −3.659E−01 |
| J | −8.515E−03 | 4.523E−03 | 2.852E−01 | −1.191E−01 | 8.856E−02 | 1.847E−01 |
| L | 2.105E−03 | −1.298E−03 | −1.070E−01 | 4.713E−02 | −4.562E−02 | −6.624E−02 |
| M | −3.630E−04 | 2.573E−04 | 2.793E−02 | −1.222E−02 | 1.562E−02 | 1.643E−02 |
| N | 4.143E−05 | −3.355E−05 | −4.819E−03 | 1.930E−03 | −3.410E−03 | −2.674E−03 |
| O | −2.810E−06 | 2.592E−06 | 4.936E−04 | −1.577E−04 | 4.295E−04 | 2.561E−04 |
| P | 8.574E−08 | −8.992E−08 | −2.272E−05 | 4.104E−06 | −2.372E−05 | −1.092E−05 |

|   | S7 | S8 | S9 | S10 | S11 | S12 |
|---|---|---|---|---|---|---|
| K | 9.900E+01 | −9.900E+01 | −1.545E+01 | −3.073E+01 | −9.900E+01 | −1.291E+00 |
| A | −1.582E−02 | −2.506E−02 | −4.325E−02 | −2.672E−02 | −5.972E−02 | −1.178E−01 |
| B | 3.352E−02 | 3.748E−02 | 5.244E−02 | 1.339E−02 | 5.728E−02 | 1.247E−01 |
| C | −1.146E−01 | −4.626E−02 | −8.332E−02 | −4.549E−03 | −4.893E−02 | −1.365E−01 |
| D | 2.527E−01 | −9.228E−03 | 8.265E−02 | −2.037E−02 | 2.490E−02 | 1.079E−01 |
| E | −4.059E−01 | 1.222E−01 | −5.056E−02 | 3.969E−02 | −9.018E−04 | −5.872E−02 |
| F | 4.867E−01 | −2.077E−01 | 1.699E−02 | −3.891E−02 | −9.393E−03 | 2.227E−02 |
| G | −4.399E−01 | 2.002E−01 | −1.542E−03 | 2.461E−02 | 7.869E−03 | −6.028E−03 |
| H | 2.990E−01 | −1.276E−01 | −6.178E−04 | −1.075E−02 | −3.582E−03 | 1.194E−03 |
| J | −1.511E−01 | 5.621E−02 | −1.759E−04 | 3.321E−03 | 1.061E−03 | −1.767E−04 |
| L | 5.561E−02 | −1.727E−02 | 3.083E−04 | −7.273E−04 | −2.139E−04 | 1.976E−05 |
| M | −1.442E−02 | 3.638E−03 | −1.215E−04 | 1.111E−04 | 2.920E−05 | −1.650E−06 |

TABLE 2-continued

| | | | | | | |
|---|---|---|---|---|---|---|
| N | 2.486E−03 | −5.010E−04 | 2.353E−05 | −1.132E−05 | −2.588E−06 | 9.765E−08 |
| O | −2.550E−04 | 4.064E−05 | −2.336E−06 | 6.946E−07 | 1.344E−07 | −3.630E−09 |
| P | 1.175E−05 | −1.471E−06 | 9.527E−08 | −1.945E−08 | −3.099E−09 | 6.296E−11 |

| | S13 | S14 | S15 | S16 | S17 | S18 |
|---|---|---|---|---|---|---|
| K | −1.508E+00 | 8.828E−01 | −1.005E+00 | 6.256E+00 | 9.184E+00 | −8.953E−01 |
| A | −6.906E−02 | −3.949E−02 | −2.123E−02 | 2.803E−02 | −4.888E−02 | −5.616E−02 |
| B | 8.962E−02 | 1.943E−02 | 5.064E−04 | −1.125E−02 | 1.096E−02 | 1.345E−02 |
| C | −1.148E−01 | −2.390E−02 | −9.635E−04 | 3.362E−03 | −1.394E−03 | −2.544E−03 |
| D | 9.223E−02 | 1.831E−02 | 7.837E−04 | −1.057E−03 | 2.910E−04 | 3.400E−04 |
| E | −4.826E−02 | −8.525E−03 | −3.538E−04 | 2.763E−04 | −7.102E−05 | −2.725E−05 |
| F | 1.722E−02 | 2.618E−03 | 9.434E−05 | −5.306E−05 | 1.118E−05 | 5.342E−07 |
| G | −4.320E−03 | −5.569E−04 | −1.574E−05 | 7.353E−06 | −1.117E−06 | 1.431E−07 |
| H | 7.762E−04 | 8.417E−05 | 1.723E−06 | −7.392E−07 | 7.453E−08 | −1.855E−08 |
| J | −1.005E−04 | −9.131E−06 | −1.269E−07 | 5.396E−08 | −3.425E−09 | 1.191E−09 |
| L | 9.309E−06 | 7.074E−07 | 6.302E−09 | −2.827E−09 | 1.093E−10 | −4.772E−11 |
| M | −6.026E−07 | −3.827E−08 | −2.060E−10 | 1.034E−10 | −2.383E−12 | 1.240E−12 |
| N | 2.592E−08 | 1.375E−09 | 4.170E−12 | −2.502E−12 | 3.395E−14 | −2.040E−14 |
| O | −6.658E−10 | −2.952E−11 | −4.557E−14 | 3.590E−14 | −2.851E−16 | 1.936E−16 |
| P | 7.738E−12 | 2.867E−13 | 1.862E−16 | −2.309E−16 | 1.071E−18 | −8.086E−19 |

Figure 3:
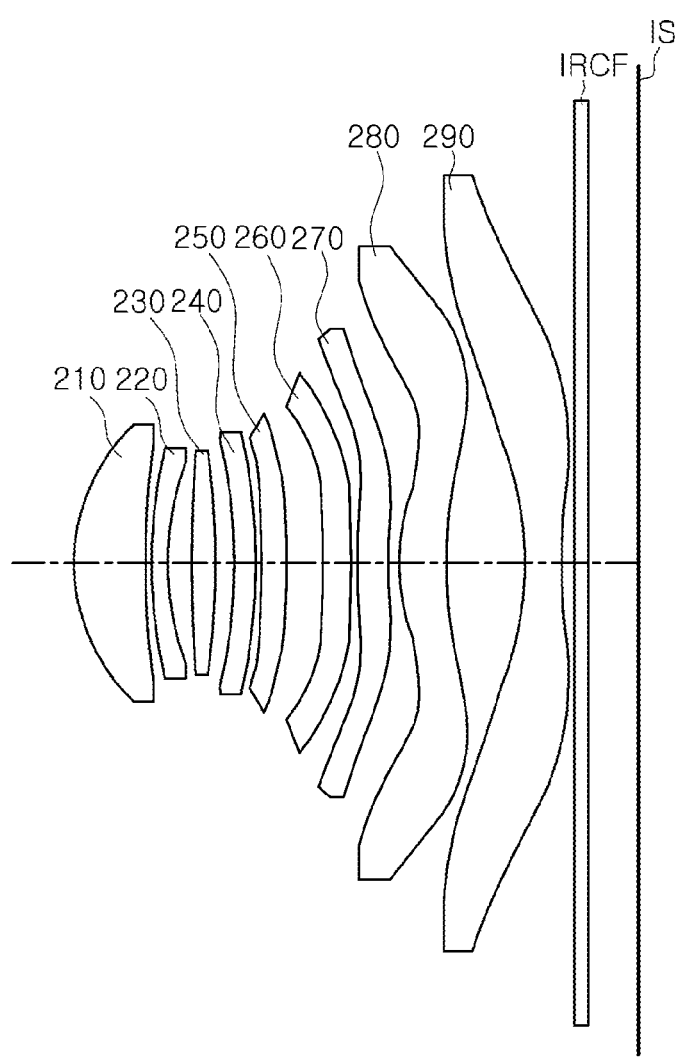
FIG. 3 is a view illustrating an optical imaging system according to a second example embodiment in the present disclosure.
Figure 4:
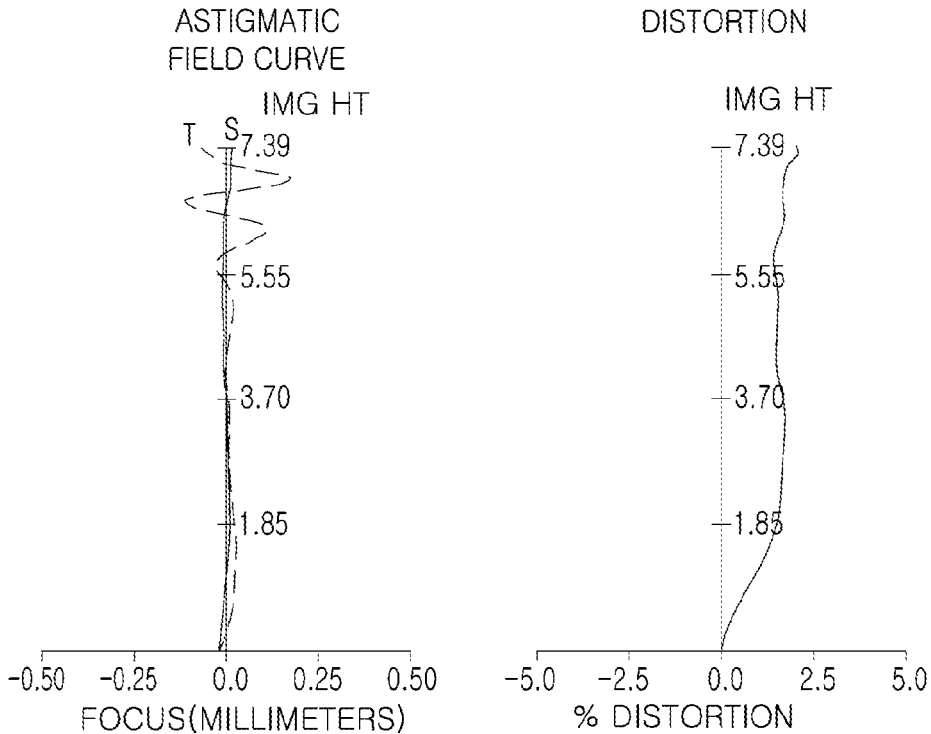
FIG. 4 presents graphs having curves representing aberration characteristics of the optical imaging system illustrated in FIG. 3.

An optical imaging system according to a second example embodiment in the present disclosure will be described with reference to FIGS. 3 and 4.

The optical imaging system according to the second example embodiment may include a first lens 210, a second lens 220, a third lens 230, a fourth lens 240, a fifth lens 250, a sixth lens 260, a seventh lens 270, an eighth lens 280, and a ninth lens 290, and may further include a stop, a filter IRCF, and an image sensor IS.

Characteristics (radii of curvature, thicknesses of lenses or distances between the lenses, refractive indices, Abbe numbers, and focal lengths) of each lens are represented in Table 3.

TABLE 3

| Surface No. | Remark | Radius of Curvature | Thickness or Distance | Refractive Index | Abbe Number | Focal Length |
|---|---|---|---|---|---|---|
| S1 | First Lens | 2.756 | 1.038 | 1.544 | 56.1 | 6.930 |
| S2 | | 8.803 | 0.122 | | | |
| S3 | Second Lens | 10.907 | 0.250 | 1.671 | 19.4 | −21.871 |
| S4 | | 6.222 | 0.358 | | | |
| S5 | Third Lens | 20.775 | 0.351 | 1.535 | 56.1 | 47.813 |
| S6 | | 108.536 | 0.296 | | | |
| S7 | Fourth Lens | −42.778 | 0.300 | 1.671 | 19.4 | −49.116 |
| S8 | | 149.690 | 0.093 | | | |
| S9 | Fifth Lens | 17.194 | 0.352 | 1.535 | 56.1 | 79.115 |
| S10 | | 28.686 | 0.589 | | | |
| S11 | Sixth Lens | 47.185 | 0.400 | 1.635 | 23.9 | −13.416 |
| S12 | | 7.238 | 0.118 | | | |
| S13 | Seventh Lens | 6.306 | 0.450 | 1.535 | 56.1 | 42.730 |
| S14 | | 8.481 | 0.175 | | | |
| S15 | Eighth Lens | 3.033 | 0.729 | 1.567 | 38.0 | 6.447 |
| S16 | | 15.902 | 1.145 | | | |
| S17 | Ninth Lens | −21.675 | 0.531 | 1.535 | 56.1 | −5.547 |
| S18 | | 3.480 | 0.250 | | | |
| S19 | Filter | Infinity | 0.210 | 1.518 | 64.2 | |
| S20 | | Infinity | 0.733 | | | |
| S21 | Imaging Plane | Infinity | | | | |

Meanwhile, an overall focal length f of the optical imaging system according to the second example embodiment may be 7.1 mm, Fno thereof may be 1.95, and IMG HT thereof may be 7.15 mm.

In the second example embodiment, the first lens 210 may have positive refractive power, and a first surface thereof may be convex while a second surface thereof may be concave.

The second lens 220 may have negative refractive power, and a first surface thereof may be convex while a second surface thereof may be concave.

The third lens 230 may have positive refractive power, and a first surface thereof may be convex while a second surface thereof may be concave.

The fourth lens 240 may have negative refractive power, and a first surface and a second surface thereof may be concave.

The fifth lens 250 may have positive refractive power, and a first surface thereof may be convex in the paraxial region and a second surface thereof may be concave in the paraxial region.

In addition, at least one inflection point may be formed on at least one of the first and second surfaces of the fifth lens 250. For example, the first surface of the fifth lens 250 may be convex in the paraxial region and concave in a portion other than the paraxial region. In addition, the second surface of the fifth lens 250 may be concave in the paraxial region and convex in a portion other than the paraxial region.

The sixth lens 260 may have negative refractive power, and a first surface thereof may be convex in the paraxial region and a second surface thereof may be concave in the paraxial region.

In addition, at least one inflection point may be formed on at least one of the first and second surfaces of the sixth lens 260. For example, the first surface of the sixth lens 260 may be convex in the paraxial region and concave in a portion other than the paraxial region. In addition, the second surface of the sixth lens 260 may be concave in the paraxial region and convex in a portion other than the paraxial region.

The seventh lens 270 may have positive refractive power, and a first surface thereof may be convex in the paraxial region and a second surface thereof may be concave in the paraxial region.

In addition, at least one inflection point may be formed on at least one of the first and second surfaces of the seventh lens 270. For example, the first surface of the seventh lens 270 may be convex in the paraxial region and concave in a portion other than the paraxial region. The second surface of the seventh lens 270 may be concave in the paraxial region and convex in a portion other than the paraxial region.

The eighth lens 280 may have positive refractive power, and a first surface thereof may be convex in the paraxial region and a second surface thereof may be concave in the paraxial region.

In addition, at least one inflection point may be formed on at least one of the first and second surfaces of the eighth lens 280. For example, the first surface of the eighth lens 280 may be convex in the paraxial region and concave in a portion other than the paraxial region. The second surface of the eighth lens 280 may be concave in the paraxial region and convex in a portion other than the paraxial region.

The ninth lens 290 may have negative refractive power, and a first surface and a second surface thereof may be concave in the paraxial region.

In addition, at least one inflection point may be formed on at least one of the first and second surfaces of the ninth lens 290. For example, the first surface of the ninth lens 290 may be concave in the paraxial region and convex in a portion other than the paraxial region. The second surface of the ninth lens 290 may be concave in the paraxial region and convex in a portion other than the paraxial region.

Meanwhile, respective surfaces of the first to ninth lenses 210 to 290 may have aspherical coefficients as represented in Table 4. For example, all of object-side surfaces and image-side surfaces of the first to ninth lenses 210 to 290 may be aspherical.

TABLE 4

|   | S1 | S2 | S3 | S4 | S5 | S6 |
|---|---|---|---|---|---|---|
| K | −9.978E−01 | 7.346E+00 | 3.118E+01 | 6.916E+00 | 9.437E+01 | −9.000E+01 |
| A | 5.126E−03 | −1.170E−02 | −1.330E−02 | −4.343E−03 | −1.436E−02 | −1.239E−02 |
| B | 7.524E−03 | 4.386E−03 | −1.067E−03 | −7.308E−03 | 1.147E−02 | −2.771E−03 |
| C | −2.282E−02 | −3.637E−03 | 4.841E−02 | 1.017E−01 | −6.496E−02 | −1.242E−03 |
| D | 4.522E−02 | 5.203E−03 | −1.539E−01 | −4.300E−01 | 2.259E−01 | 2.232E−02 |
| E | −5.923E−02 | −6.461E−03 | 3.114E−01 | 1.171E+00 | −5.297E−01 | −7.180E−02 |
| F | 5.374E−02 | 5.981E−03 | −4.354E−01 | −2.190E+00 | 8.626E−01 | 1.249E−01 |
| G | −3.474E−02 | −4.229E−03 | 4.312E−01 | 2.891E+00 | −9.986E−01 | −1.380E−01 |
| H | 1.624E−02 | 2.277E−03 | −3.064E−01 | −2.733E+00 | 8.328E−01 | 1.033E−01 |
| J | −5.505E−03 | −9.128E−04 | 1.566E−01 | 1.856E+00 | −5.018E−01 | −5.373E−02 |
| L | 1.341E−03 | 2.644E−04 | −5.704E−02 | −8.979E−01 | 2.165E−01 | 1.950E−02 |
| M | −2.286E−04 | −5.324E−05 | 1.444E−02 | 3.016E−01 | −6.522E−02 | −4.857E−03 |
| N | 2.590E−05 | 7.029E−06 | −2.414E−03 | −6.685E−02 | 1.303E−02 | 7.934E−04 |
| O | −1.750E−06 | −5.447E−07 | 2.394E−04 | 8.784E−03 | −1.554E−03 | −7.677E−05 |
| P | 5.337E−08 | 1.873E−08 | −1.067E−05 | −5.183E−04 | 8.365E−05 | 3.344E−06 |

|   | S7 | S8 | S9 | S10 | S11 | S12 |
|---|---|---|---|---|---|---|
| K | 9.485E+01 | −9.900E+01 | −1.342E+01 | −5.115E+01 | −5.898E+01 | −2.307E+00 |
| A | −1.454E−02 | −2.274E−02 | −4.260E−02 | −2.696E−02 | −5.818E−02 | −1.137E−01 |
| B | 2.571E−02 | 2.941E−02 | 5.083E−02 | 1.420E−02 | 5.543E−02 | 1.155E−01 |
| C | −8.984E−02 | −3.139E−02 | −8.023E−02 | −7.599E−03 | −4.890E−02 | −1.202E−01 |
| D | 1.922E−01 | −2.177E−02 | 8.194E−02 | −1.285E−02 | 3.027E−02 | 9.108E−02 |
| E | −2.931E−01 | 1.191E−01 | −5.434E−02 | 2.858E−02 | −1.114E−02 | −4.787E−02 |
| F | 3.267E−01 | −1.881E−01 | 2.312E−02 | −2.787E−02 | 6.703E−04 | 1.762E−02 |
| G | −2.710E−01 | 1.766E−01 | −6.579E−03 | 1.688E−02 | 1.671E−03 | −4.645E−03 |
| H | 1.683E−01 | −1.112E−01 | 1.964E−03 | −6.886E−03 | −1.017E−03 | 9.005E−04 |
| J | −7.797E−02 | 4.869E−02 | −1.030E−03 | 1.940E−03 | 3.281E−04 | −1.312E−04 |

TABLE 4-continued

| | | | | | | |
|---|---|---|---|---|---|---|
| L | 2.650E-02 | -1.491E-02 | 4.860E-04 | -3.779E-04 | -6.829E-05 | 1.451E-05 |
| M | -6.408E-03 | 3.136E-03 | -1.423E-04 | 5.007E-05 | 9.465E-06 | -1.200E-06 |
| N | 1.040E-03 | -4.316E-04 | 2.439E-05 | -4.333E-06 | -8.470E-07 | 7.012E-08 |
| O | -1.013E-04 | 3.499E-05 | -2.267E-06 | 2.233E-07 | 4.430E-08 | -2.562E-09 |
| P | 4.456E-06 | -1.266E-06 | 8.866E-08 | -5.280E-09 | -1.027E-09 | 4.343E-11 |

| | S13 | S14 | S15 | S16 | S17 | S18 |
|---|---|---|---|---|---|---|
| K | -1.717E+00 | 7.065E-01 | -1.014E+00 | 5.472E+00 | 9.148E+00 | -8.985E-01 |
| A | -6.337E-02 | -3.603E-02 | -2.201E-02 | 2.761E-02 | -4.818E-02 | -5.439E-02 |
| B | 7.883E-02 | 1.510E-02 | 1.016E-03 | -1.008E-02 | 1.051E-02 | 1.274E-02 |
| C | -9.881E-02 | -2.088E-02 | -1.567E-03 | 2.602E-03 | -1.227E-03 | -2.371E-03 |
| D | 7.741E-02 | 1.671E-02 | 1.170E-03 | -8.114E-04 | 2.404E-04 | 3.101E-04 |
| E | -3.930E-02 | -7.813E-03 | -5.085E-04 | 2.279E-04 | -5.972E-05 | -2.361E-05 |
| F | 1.355E-02 | 2.367E-03 | 1.352E-04 | -4.676E-05 | 9.426E-06 | 2.485E-07 |
| G | -3.276E-03 | -4.907E-04 | -2.305E-05 | 6.809E-06 | -9.285E-07 | 1.547E-07 |
| H | 5.658E-04 | 7.167E-05 | 2.631E-06 | -7.096E-07 | 6.037E-08 | -1.844E-08 |
| J | -7.026E-05 | -7.456E-06 | -2.061E-07 | 5.315E-08 | -2.675E-09 | 1.149E-09 |
| L | 6.233E-06 | 5.502E-07 | 1.113E-08 | -2.837E-09 | 8.140E-11 | -4.514E-11 |
| M | -3.859E-07 | -2.817E-08 | -4.083E-10 | 1.051E-10 | -1.671E-12 | 1.156E-12 |
| N | 1.585E-08 | 9.518E-10 | 9.714E-12 | -2.564E-12 | 2.206E-14 | -1.880E-14 |
| O | -3.888E-10 | -1.911E-11 | -1.352E-13 | 3.698E-14 | -1.679E-16 | 1.765E-16 |
| P | 4.312E-12 | 1.726E-13 | 8.351E-16 | -2.384E-16 | 5.549E-19 | -7.305E-19 |

Figure 5:
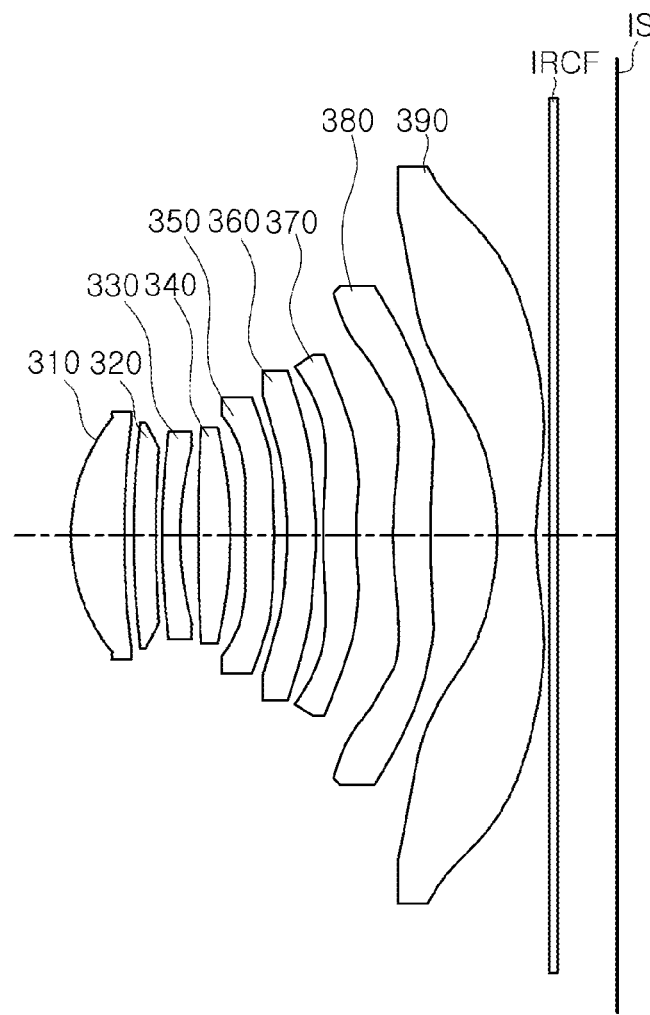
FIG. 5 is a view illustrating an optical imaging system according to a third example embodiment in the present disclosure.
Figure 6:
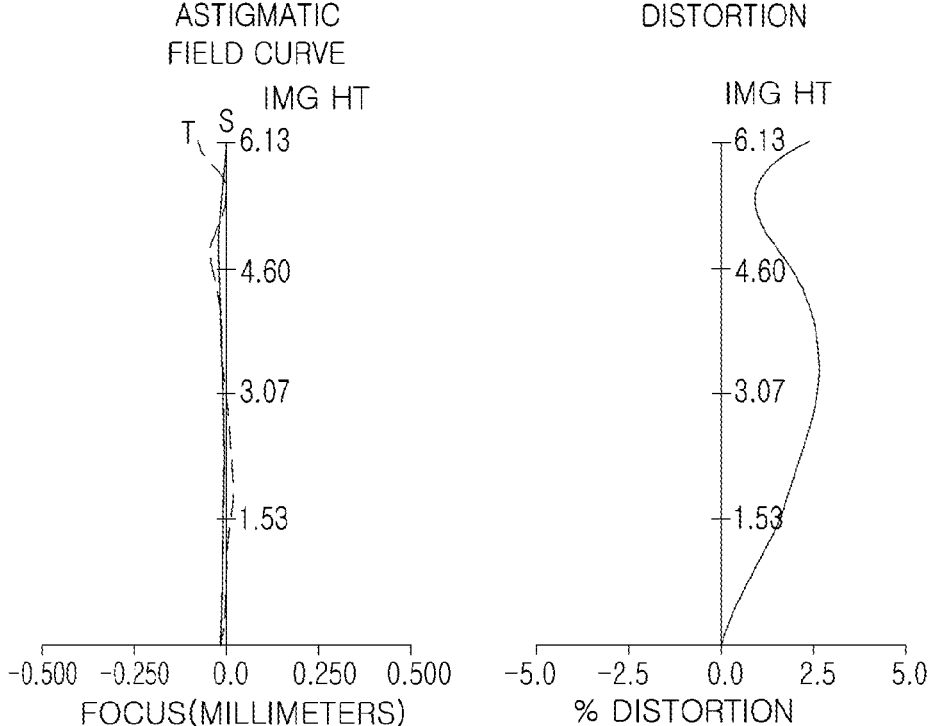
FIG. 6 shows graphs having curves representing aberration characteristics of the optical imaging system illustrated in FIG. 5.

An optical imaging system according to a third example embodiment in the present disclosure will be described with reference to FIGS. 5 and 6.

The optical imaging system according to the third example embodiment may include a first lens 310, a second lens 320, a third lens 330, a fourth lens 340, a fifth lens 350, a sixth lens 360, a seventh lens 370, an eighth lens 380, and a ninth lens 390, and may further include a stop, a filter IRCF, and an image sensor IS.

Characteristics (radii of curvature, thicknesses of lenses or distances between the lenses, refractive indices, Abbe numbers, and focal lengths) of each lens are represented in Table 5.

TABLE 5

| Surface No. | Remark | Radius of Curvature | Thickness or Distance | Refractive Index | Abbe Number | Focal Length |
|---|---|---|---|---|---|---|
| S1 | First Lens | 2.284 | 0.686 | 1.544 | 56.1 | 5.733 |
| S2 | | 7.538 | 0.125 | | | |
| S3 | Second Lens | 30.148 | 0.250 | 1.639 | 23.5 | -47.503 |
| S4 | | 15.206 | 0.085 | | | |
| S5 | Third Lens | 6.714 | 0.250 | 1.680 | 18.4 | -23.489 |
| S6 | | 4.673 | 0.217 | | | |
| S7 | Fourth Lens | 11.964 | 0.416 | 1.535 | 56.1 | 22.384 |
| S8 | | 2274.235 | 0.228 | | | |
| S9 | Fifth Lens | 45.757 | 0.340 | 1.544 | 56.1 | 49.721 |
| S10 | | -68.751 | 0.185 | | | |
| S11 | Sixth Lens | -3.718 | 0.340 | 1.639 | 23.5 | -12.517 |
| S12 | | -7.084 | 0.085 | | | |
| S13 | Seventh Lens | 6.671 | 0.450 | 1.567 | 38.0 | 16.108 |
| S14 | | 24.073 | 0.441 | | | |
| S15 | Eighth Lens | 3.995 | 0.500 | 1.567 | 38.0 | 9.967 |
| S16 | | 12.739 | 0.872 | | | |
| S17 | Ninth Lens | -7.519 | 0.500 | 1.535 | 56.1 | -4.693 |
| S18 | | 3.880 | 0.161 | | | |
| S19 | Filter | Infinity | 0.110 | 1.518 | 64.2 | |
| S20 | | Infinity | 0.760 | | | |
| S21 | Imaging Plane | Infinity | | | | |

Meanwhile, an overall focal length f of the optical imaging system according to the third example embodiment may be 5.88 mm, Fno thereof may be 2.00, and IMG HT thereof may be 6 mm.

In the third example embodiment, the first lens 310 may have positive refractive power, and a first surface thereof may be convex while a second surface thereof may be concave.

The second lens 320 may have negative refractive power, and a first surface thereof may be convex while a second surface thereof may be concave.

The third lens 330 may have negative refractive power, and a first surface thereof may be convex while a second surface thereof may be concave.

The fourth lens 340 may have positive refractive power, and a first surface thereof may be convex while a second surface thereof may be concave.

The fifth lens 350 may have positive refractive power, and a first surface and a second surface thereof may be convex in the paraxial region.

In addition, at least one inflection point may be formed on at least one of the first and second surfaces of the fifth lens 350. For example, the first surface of the fifth lens 350 may be convex in the paraxial region and concave in a portion other than the paraxial region. The second surface of the fifth lens 350 may be convex in the paraxial region and concave in a portion other than the paraxial region.

The sixth lens 360 may have negative refractive power, and a first surface thereof may be concave in the paraxial region and a second surface thereof may be convex in the paraxial region.

In addition, at least one inflection point may be formed on at least one of the first and second surfaces of the sixth lens 360. For example, the first surface of the sixth lens 360 may be concave in the paraxial region and convex in a portion other than the paraxial region. The second surface of the sixth lens 360 may be convex in the paraxial region and concave in a portion other than the paraxial region.

The seventh lens 370 may have positive refractive power, and a first surface thereof may be convex in the paraxial region and a second surface thereof may be concave in the paraxial region.

In addition, at least one inflection point may be formed on at least one of the first and second surfaces of the seventh lens 370. For example, the first surface of the seventh lens 370 may be convex in the paraxial region and concave in a portion other than the paraxial region. The second surface of the seventh lens 370 may be concave in the paraxial region and convex in a portion other than the paraxial region.

The eighth lens 380 may have positive refractive power, and a first surface thereof may be convex in the paraxial region and a second surface thereof may be concave in the paraxial region.

In addition, at least one inflection point may be formed on at least one of the first and second surfaces of the eighth lens 380. For example, the first surface of the eighth lens 380 may be convex in the paraxial region and concave in a portion other than the paraxial region. The second surface of the eighth lens 380 may be concave in the paraxial region and convex in a portion other than the paraxial region.

The ninth lens 390 may have negative refractive power, and a first surface and a second surface thereof may be concave in the paraxial region.

In addition, at least one inflection point may be formed on at least one of the first and second surfaces of the ninth lens 390. For example, the first surface of the ninth lens 390 may be concave in the paraxial region and convex in a portion other than the paraxial region. The second surface of the ninth lens 390 may be concave in the paraxial region and convex in a portion other than the paraxial region.

Meanwhile, respective surfaces of the first to ninth lenses 310 to 390 may have aspherical coefficients as represented in Table 6. For example, all of object-side surfaces and image-side surfaces of the first to ninth lenses 310 to 390 may be aspherical.

TABLE 6

|   | S1 | S2 | S3 | S4 | S5 | S6 |
|---|---|---|---|---|---|---|
| K | −2.933E−01 | −5.574E+01 | 3.033E+01 | 4.280E+01 | −1.014E+01 | −7.437E+00 |
| A | 2.967E−04 | 1.087E−03 | 1.228E−02 | 4.140E−02 | 9.901E−03 | 1.452E−02 |
| B | −6.800E−03 | −1.308E−02 | 7.648E−03 | −3.525E−02 | −5.538E−02 | −2.101E−01 |
| C | 6.023E−02 | −3.571E−03 | −1.970E−01 | −4.647E−01 | −5.279E−02 | 1.894E+00 |
| D | −2.984E−01 | 2.922E−02 | 7.549E−01 | 3.205E+00 | 4.867E−01 | −1.118E+01 |
| E | 8.990E−01 | −3.507E−02 | −1.655E+00 | −1.209E+01 | −1.238E+00 | 4.394E+01 |
| F | −1.786E+00 | 2.241E−02 | 2.463E+00 | 3.029E+01 | 1.904E+00 | −1.192E+02 |
| G | 2.436E+00 | −9.011E−03 | −2.599E+00 | −5.277E+01 | −1.974E+00 | 2.298E+02 |
| H | −2.330E+00 | 2.427E−03 | 1.945E+00 | 6.501E+01 | 1.428E+00 | −3.195E+02 |
| J | 1.577E+00 | −4.500E−04 | −1.005E+00 | −5.690E+01 | −7.284E−01 | 3.212E+02 |
| L | −7.511E−01 | 5.771E−05 | 3.345E−01 | 3.510E+01 | 2.601E−01 | −2.312E+02 |
| M | 2.459E−01 | −5.038E−06 | −5.854E−02 | −1.490E+01 | −6.355E−02 | 1.162E+02 |
| N | −5.269E−02 | 2.860E−07 | −2.049E−04 | 4.139E+00 | 1.010E−02 | −3.868E+01 |
| O | 6.647E−03 | −9.528E−09 | 1.989E−03 | −6.760E−01 | −9.401E−04 | 7.661E+00 |
| P | −3.743E−04 | 1.416E−10 | −2.499E−04 | 4.915E−02 | 3.884E−05 | −6.835E−01 |

|   | S7 | S8 | S9 | S10 | S11 | S12 |
|---|---|---|---|---|---|---|
| K | 4.875E+01 | −9.900E+01 | −9.900E+01 | −9.900E+01 | −4.002E+00 | 3.183E+00 |
| A | −2.494E−02 | −2.311E−02 | −4.996E−02 | −5.806E−02 | −1.115E−02 | 2.431E−02 |
| B | 2.111E−01 | −5.995E−02 | −2.338E−02 | 1.374E−01 | 1.530E−01 | −5.622E−02 |
| C | −2.104E+00 | 5.133E−01 | 4.730E−01 | −2.208E−01 | −2.667E−01 | 1.800E−01 |
| D | 1.212E+01 | −2.572E+00 | −2.572E+00 | 1.244E−02 | 2.580E−02 | −4.395E−01 |
| E | −4.569E+01 | 7.999E+00 | 7.637E+00 | 5.412E−01 | 6.065E−01 | 6.581E−01 |
| F | 1.183E+02 | −1.689E+01 | −1.463E+01 | −1.056E+00 | −1.175E+00 | −6.456E−01 |
| G | −2.165E+02 | 2.523E+01 | 1.924E+01 | 1.117E+00 | 1.238E+00 | 4.381E−01 |
| H | 2.845E+02 | −2.722E+01 | −1.784E+01 | −7.673E−01 | −8.579E−01 | −2.115E−01 |
| J | −2.694E+02 | 2.135E+01 | 1.178E+01 | 3.601E−01 | 4.122E−01 | 7.334E−02 |
| L | 1.821E+02 | −1.208E+01 | −5.507E+00 | −1.167E−01 | −1.387E−01 | −1.816E−02 |
| M | −8.562E+01 | 4.817E+00 | 1.779E+00 | 2.568E−02 | 3.221E−02 | 3.135E−03 |

TABLE 6-continued

| | | | | | | |
|---|---|---|---|---|---|---|
| N | 2.658E+01 | −1.284E+00 | −3.776E−01 | −3.666E−03 | −4.923E−03 | −3.590E−04 |
| O | −4.895E+00 | 2.053E−01 | 4.737E−02 | 3.061E−04 | 4.464E−04 | 2.450E−05 |
| P | 4.044E−01 | −1.491E−02 | −2.659E−03 | −1.134E−05 | −1.821E−05 | −7.547E−07 |

| | S13 | S14 | S15 | S16 | S17 | S18 |
|---|---|---|---|---|---|---|
| K | 3.732E+00 | 7.476E+01 | 3.130E−01 | 1.089E+01 | 3.481E−01 | −1.801E+00 |
| A | 2.020E−02 | 9.798E−03 | 8.696E−03 | 3.465E−02 | −5.509E−02 | −5.890E−02 |
| B | −2.091E−01 | −1.498E−01 | −8.315E−02 | −6.544E−02 | 9.748E−04 | 1.128E−02 |
| C | 4.629E−01 | 2.511E−01 | 6.759E−02 | 3.805E−02 | 3.989E−03 | −3.180E−04 |
| D | −6.922E−01 | −2.659E−01 | −3.743E−02 | −1.525E−02 | −7.983E−04 | −4.729E−04 |
| E | 7.320E−01 | 1.981E−01 | 1.552E−02 | 5.001E−03 | 2.211E−05 | 1.566E−04 |
| F | −5.612E−01 | −1.074E−01 | −4.803E−03 | −1.423E−03 | 1.489E−05 | −2.885E−05 |
| G | 3.159E−01 | 4.272E−02 | 1.044E−03 | 3.387E−04 | −3.100E−06 | 3.600E−06 |
| H | −1.311E−01 | −1.244E−02 | −1.421E−04 | −6.282E−05 | 3.406E−07 | −3.204E−07 |
| J | 3.996E−02 | 2.629E−03 | 8.246E−06 | 8.610E−06 | −2.493E−08 | 2.064E−08 |
| L | −8.819E−03 | −3.966E−04 | 7.398E−07 | −8.424E−07 | 1.288E−09 | −9.569E−10 |
| M | 1.368E−03 | 4.148E−05 | −1.915E−07 | 5.690E−08 | −4.692E−11 | 3.118E−11 |
| N | −1.409E−04 | −2.847E−06 | 1.680E−08 | −2.515E−09 | 1.153E−12 | −6.779E−13 |
| O | 8.637E−06 | 1.148E−07 | −7.232E−10 | 6.543E−11 | −1.717E−14 | 8.823E−15 |
| P | −2.374E−07 | −2.051E−09 | 1.275E−11 | −7.593E−13 | 1.167E−16 | −5.193E−17 |

Figure 7:
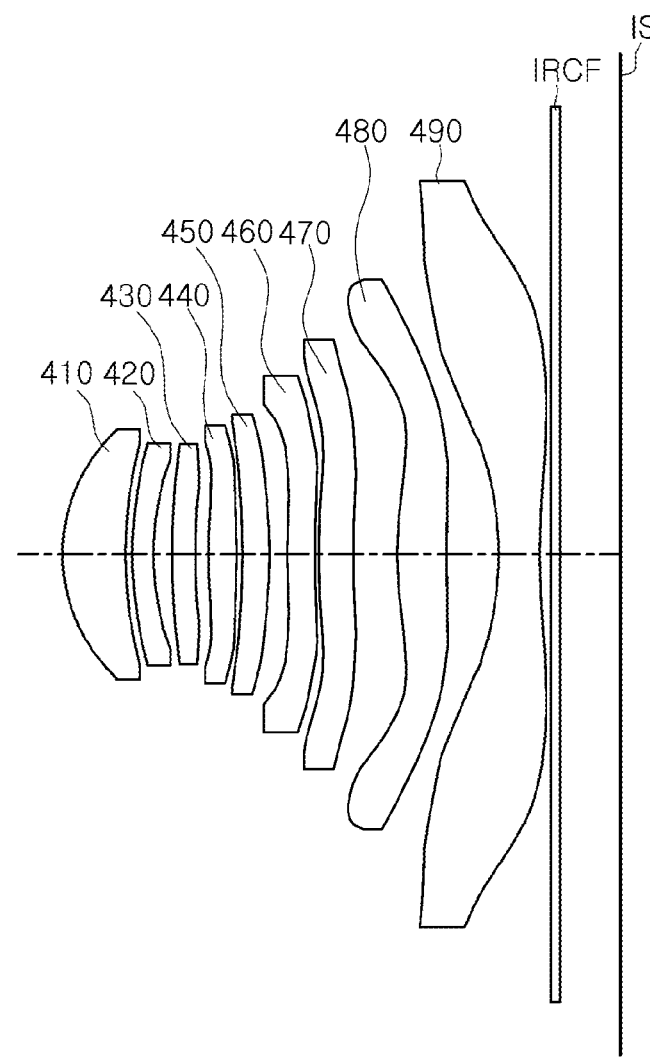
FIG. 7 is a view illustrating an optical imaging system according to a fourth example embodiment in the present disclosure.
Figure 8:
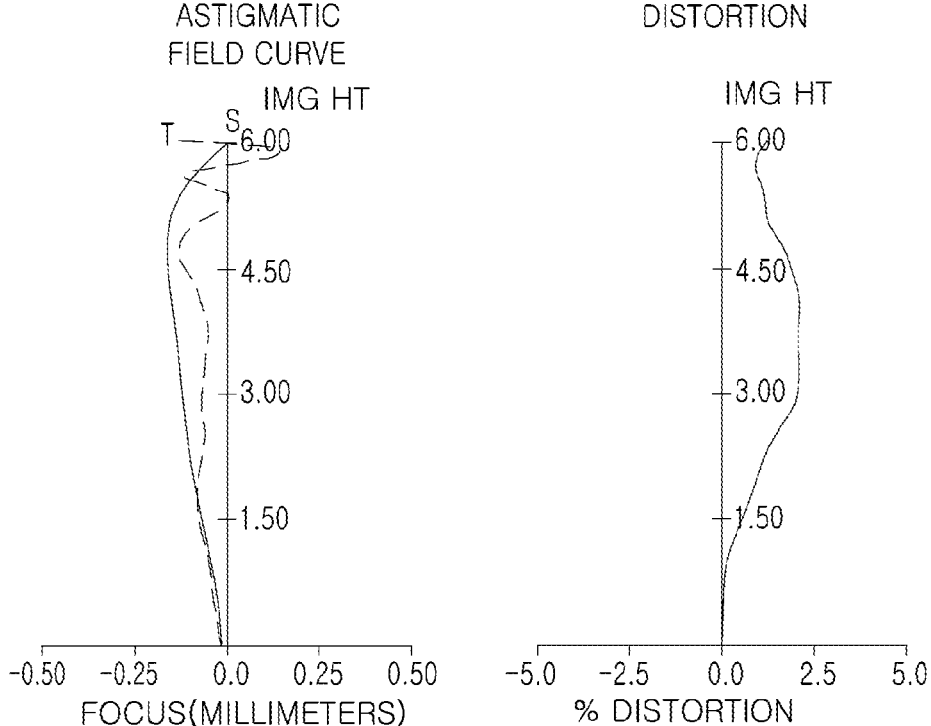
FIG. 8 presents graphs having curves representing aberration characteristics of the optical imaging system illustrated in FIG. 7.

An optical imaging system according to a fourth example embodiment in the present disclosure will be described with reference to FIGS. 7 and 8.

The optical imaging system according to the fourth example embodiment may include a first lens 410, a second lens 420, a third lens 430, a fourth lens 440, a fifth lens 450, a sixth lens 460, a seventh lens 470, an eighth lens 480, and a ninth lens 490, and may further include a stop, a filter IRCF, and an image sensor IS.

Characteristics (radii of curvature, thicknesses of lenses or distances between the lenses, refractive indices, Abbe numbers, and focal lengths) of each lens are represented in Table 7.

TABLE 7

| Surface No. | Remark | Radius of Curvature | Thickness or Distance | Refractive Index | Abbe Number | Focal Length |
|---|---|---|---|---|---|---|
| S1 | First Lens | 2.174 | 0.769 | 1.544 | 56.1 | 6.626 |
| S2 | | 4.768 | 0.085 | | | |
| S3 | Second Lens | 6.594 | 0.250 | 1.671 | 19.4 | −23.454 |
| S4 | | 4.588 | 0.259 | | | |
| S5 | Third Lens | 5.432 | 0.284 | 1.661 | 20.4 | 97.758 |
| S6 | | 5.802 | 0.178 | | | |
| S7 | Fourth Lens | 9.747 | 0.319 | 1.544 | 56.1 | 24.846 |
| S8 | | 34.238 | 0.094 | | | |
| S9 | Fifth Lens | −8.720 | 0.341 | 1.567 | 38.0 | −195.328 |
| S10 | | −9.595 | 0.230 | | | |
| S11 | Sixth Lens | 14.417 | 0.340 | 1.640 | 23.5 | −17.581 |
| S12 | | 6.283 | 0.058 | | | |
| S13 | Seventh Lens | 5.110 | 0.450 | 1.640 | 23.5 | 18.707 |
| S14 | | 8.569 | 0.544 | | | |
| S15 | Eighth Lens | 4.164 | 0.658 | 1.544 | 56.1 | 7.872 |
| S16 | | 126.915 | 0.627 | | | |
| S17 | Ninth Lens | −7.275 | 0.525 | 1.535 | 56.1 | −5.152 |
| S18 | | 4.572 | 0.120 | | | |
| S19 | Filter | Infinity | 0.110 | 1.518 | 64.2 | |
| S20 | | Infinity | 0.760 | | | |
| S21 | Imaging Plane | Infinity | | | | |

Meanwhile, an overall focal length f of the optical imaging system according to the fourth example embodiment may be 5.7 mm, Fno thereof may be 2.1, and IMG HT thereof may be 6 mm.

In the fourth example embodiment, the first lens 410 may have positive refractive power, and a first surface thereof may be convex while a second surface thereof may be concave.

The second lens 420 may have negative refractive power, and a first surface thereof may be convex while a second surface thereof may be concave.

The third lens 430 may have positive refractive power, and a first surface thereof may be convex while a second surface thereof may be concave.

The fourth lens 440 may have positive refractive power, and a first surface thereof may be convex while a second surface thereof may be concave.

The fifth lens 450 may have negative refractive power, and a first surface thereof may be concave in the paraxial region and a second surface thereof may be convex in the paraxial region.

In addition, at least one inflection point may be formed on at least one of the first and second surfaces of the fifth lens 450. For example, the first surface of the fifth lens 450 may be concave in the paraxial region and convex in a portion other than the paraxial region. The second surface of the fifth lens 450 may be convex in the paraxial region and concave in a portion other than the paraxial region.

The sixth lens 460 may have negative refractive power, and a first surface thereof may be convex in the paraxial region and a second surface thereof may be concave in the paraxial region.

In addition, at least one inflection point may be formed on at least one of the first and second surfaces of the sixth lens 460. For example, the first surface of the sixth lens 460 may be convex in the paraxial region and concave in a portion other than the paraxial region. The second surface of the sixth lens 460 may be concave in the paraxial region and convex in a portion other than the paraxial region.

The seventh lens 470 may have positive refractive power, and a first surface thereof may be convex in the paraxial region and a second surface thereof may be concave in the paraxial region.

In addition, at least one inflection point may be formed on at least one of the first and second surfaces of the seventh lens 470. For example, the first surface of the seventh lens 470 may be convex in the paraxial region and concave in a portion other than the paraxial region. The second surface of the seventh lens 470 may be concave in the paraxial region and convex in a portion other than the paraxial region.

The eighth lens 480 may have positive refractive power, and a first surface thereof may be convex in the paraxial region and a second surface thereof may be concave in the paraxial region.

In addition, at least one inflection point may be formed on at least one of the first and second surfaces of the eighth lens 480. For example, the first surface of the eighth lens 480 may be convex in the paraxial region and concave in a portion other than the paraxial region. The second surface of the eighth lens 480 may be concave in the paraxial region and convex in a portion other than the paraxial region.

The ninth lens 490 may have negative refractive power, and a first surface and a second surface thereof may be concave in the paraxial region.

In addition, at least one inflection point may be formed on at least one of the first and second surfaces of the ninth lens 490. For example, the first surface of the ninth lens 490 may be concave in the paraxial region and convex in a portion other than the paraxial region. The second surface of the ninth lens 490 may be concave in the paraxial region and convex in a portion other than the paraxial region.

Meanwhile, respective surfaces of the first to ninth lenses 410 to 490 may have aspherical coefficients as represented in Table 8. For example, all of object-side surfaces and image-side surfaces of the first to ninth lenses 410 to 490 may be aspherical.

TABLE 8

|   | S1 | S2 | S3 | S4 | S5 | S6 |
|---|---|---|---|---|---|---|
| K | −4.351E−02 | −6.401E+00 | 2.695E+00 | 8.197E−01 | −1.000E+00 | −1.000E+00 |
| A | 4.189E−03 | −4.726E−02 | −5.760E−02 | 2.184E−02 | −4.767E−02 | −5.477E−02 |
| B | 1.472E−02 | 3.062E−01 | 2.824E−01 | −4.803E−01 | 3.873E−02 | 1.833E−01 |
| C | −2.860E−01 | −2.004E+00 | −1.675E+00 | 4.269E+00 | 3.350E−01 | −1.117E+00 |
| D | 1.613E+00 | 8.715E+00 | 7.444E+00 | −2.279E+01 | −3.861E+00 | 4.514E+00 |
| E | −4.969E+00 | −2.524E+01 | −2.250E+01 | 8.312E+01 | 1.857E+01 | −1.234E+01 |
| F | 9.723E+00 | 5.054E+01 | 4.753E+01 | −2.143E+02 | −5.304E+01 | 2.355E+01 |
| G | −1.291E+01 | −7.186E+01 | −7.182E+01 | 3.977E+02 | 9.946E+01 | −3.212E+01 |
| H | 1.201E+01 | 7.351E+01 | 7.848E+01 | −5.362E+02 | −1.280E+02 | 3.167E+01 |
| J | −7.923E+00 | −5.423E+01 | −6.202E+01 | 5.248E+02 | 1.151E+02 | −2.261E+01 |
| L | 3.692E+00 | 2.857E+01 | 3.506E+01 | −3.689E+02 | −7.234E+01 | 1.157E+01 |
| M | −1.189E+00 | −1.047E+01 | −1.380E+01 | 1.812E+02 | 3.110E+01 | −4.135E+00 |
| N | 2.517E−01 | 2.536E+00 | 3.591E+00 | −5.904E+01 | −8.710E+00 | 9.807E−01 |
| O | −3.152E−02 | −3.647E−01 | −5.546E−01 | 1.146E+01 | 1.430E+00 | −1.387E−01 |
| P | 1.770E−03 | 2.357E−02 | 3.846E−02 | −1.002E+00 | −1.042E−01 | 8.855E−03 |

|   | S7 | S8 | S9 | S10 | S11 | S12 |
|---|---|---|---|---|---|---|
| K | −1.270E+01 | −1.009E+01 | −5.404E−01 | −8.442E+00 | −2.708E+00 | −1.000E+00 |
| A | −2.418E−02 | 1.034E−02 | 4.679E−02 | −4.160E−03 | −3.659E−02 | −8.105E−02 |
| B | 2.396E−02 | −4.403E−02 | −1.137E−01 | 7.605E−02 | 5.117E−02 | 8.135E−02 |
| C | −2.086E−01 | 5.415E−03 | 2.880E−01 | −4.166E−01 | −1.231E−01 | −1.021E−01 |
| D | 7.587E−01 | 6.050E−02 | −7.387E−01 | 1.120E+00 | 1.814E−01 | 9.800E−02 |
| E | −1.689E+00 | −9.362E−02 | 1.398E+00 | −1.961E+00 | −1.804E−01 | −6.782E−02 |
| F | 2.499E+00 | 7.644E−02 | −1.802E+00 | 2.393E+00 | 1.260E−01 | 3.400E−02 |
| G | −2.554E+00 | −4.181E−02 | 1.605E+00 | −2.087E+00 | −6.285E−02 | −1.252E−02 |
| H | 1.825E+00 | 1.686E−02 | −1.006E+00 | 1.312E+00 | 2.224E−02 | 3.414E−03 |
| J | −9.084E−01 | −5.191E−03 | 4.467E−01 | −5.951E−01 | −5.403E−03 | −6.881E−04 |
| L | 3.092E−01 | 1.196E−03 | −1.397E−01 | 1.924E−01 | 8.343E−04 | 1.012E−04 |
| M | −6.903E−02 | −1.925E−04 | 3.009E−02 | −4.319E−02 | −6.453E−05 | −1.057E−05 |

TABLE 8-continued

| N | 9.312E−03 | 1.938E−05 | −4.242E−03 | 6.391E−03 | −1.065E−06 | 7.429E−07 |
|---|---|---|---|---|---|---|
| O | −6.305E−04 | −9.968E−07 | 3.525E−04 | −5.603E−04 | 6.080E−07 | −3.158E−08 |
| P | 1.161E−05 | 1.445E−08 | −1.308E−05 | 2.203E−05 | −3.390E−08 | 6.138E−10 |

| | S13 | S14 | S15 | S16 | S17 | S18 |
|---|---|---|---|---|---|---|
| K | −1.000E+00 | −1.000E+00 | −1.912E+00 | −2.674E+00 | −1.000E+00 | −1.000E+00 |
| A | −8.668E−02 | −4.927E−02 | −3.622E−02 | −2.022E−02 | −8.825E−02 | −8.670E−02 |
| B | 9.182E−02 | 3.228E−02 | 2.709E−03 | 7.820E−03 | 5.702E−02 | 5.295E−02 |
| C | −1.302E−01 | −3.401E−02 | 1.218E−02 | 3.388E−03 | −2.323E−02 | −2.375E−02 |
| D | 1.496E−01 | 3.432E−02 | −1.849E−02 | −7.812E−03 | 6.564E−03 | 7.426E−03 |
| E | −1.256E−01 | −2.610E−02 | 1.311E−02 | 4.915E−03 | −1.301E−03 | −1.623E−03 |
| F | 7.549E−02 | 1.402E−02 | −5.755E−03 | −1.760E−03 | 1.842E−04 | 2.518E−04 |
| G | −3.267E−02 | −5.324E−03 | 1.701E−03 | 4.143E−04 | −1.898E−05 | −2.812E−05 |
| H | 1.024E−02 | 1.443E−03 | −3.504E−04 | −6.742E−05 | 1.435E−06 | 2.281E−06 |
| J | −2.320E−03 | −2.797E−04 | 5.087E−05 | 7.715E−06 | −7.952E−08 | −1.344E−07 |
| L | 3.757E−04 | 3.847E−05 | −5.189E−06 | −6.185E−07 | 3.193E−09 | 5.692E−09 |
| M | −4.238E−05 | −3.667E−06 | 3.639E−07 | 3.397E−08 | −9.035E−11 | −1.686E−10 |
| N | 3.161E−06 | 2.304E−07 | −1.672E−08 | −1.215E−09 | 1.708E−12 | 3.312E−12 |
| O | −1.401E−07 | −8.588E−09 | 4.527E−10 | 2.546E−11 | −1.936E−14 | −3.876E−14 |
| P | 2.795E−09 | 1.439E−10 | −5.479E−12 | −2.363E−13 | 9.954E−17 | 2.043E−16 |

Figure 9:
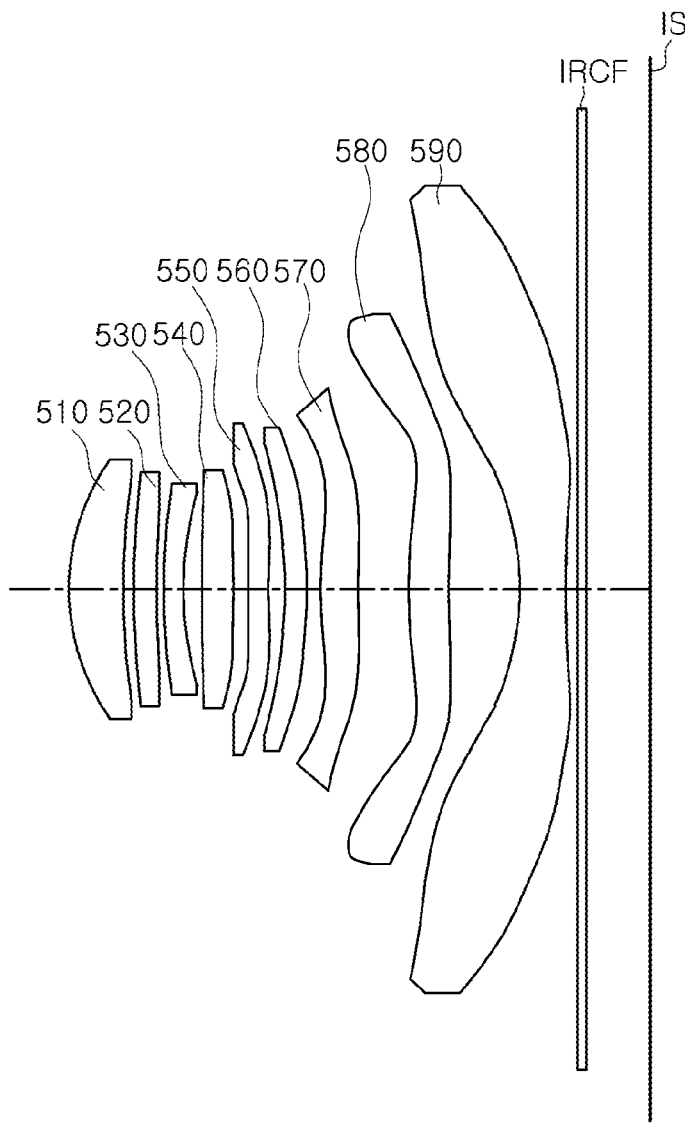
FIG. 9 is a view illustrating an optical imaging system according to a fifth example embodiment in the present disclosure.
Figure 10:
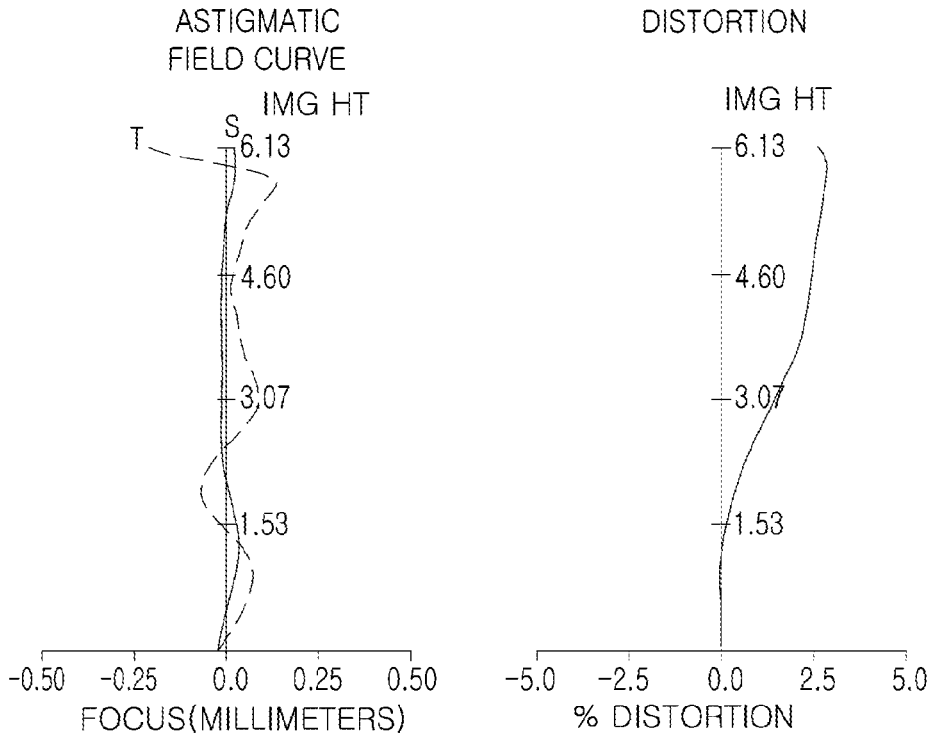
FIG. 10 presents graphs having curves representing aberration characteristics of the optical imaging system illustrated in FIG. 9.

An optical imaging system according to a fifth example embodiment in the present disclosure will be described with reference to FIGS. 9 and 10.

The optical imaging system according to the fifth example embodiment may include a first lens 510, a second lens 520, a third lens 530, a fourth lens 540, a fifth lens 550, a sixth lens 560, a seventh lens 570, an eighth lens 580, and a ninth lens 590, and may further include a stop, a filter IRCF, and an image sensor IS.

Characteristics (radii of curvature, thicknesses of lenses or distances between the lenses, refractive indices, Abbe numbers, and focal lengths) of each lens are represented in Table 9.

TABLE 9

| Surface No. | Remark | Radius of Curvature | Thickness or Distance | Refractive Index | Abbe Number | Focal Length |
|---|---|---|---|---|---|---|
| S1 | First Lens | 2.313 | 0.675 | 1.544 | 56.1 | 5.786 |
| S2 | | 7.729 | 0.146 | | | |
| S3 | Second Lens | 45.284 | 0.250 | 1.640 | 23.5 | −93.711 |
| S4 | | 25.842 | 0.085 | | | |
| S5 | Third Lens | 7.733 | 0.250 | 1.680 | 18.4 | −19.690 |
| S6 | | 4.861 | 0.204 | | | |
| S7 | Fourth Lens | 11.063 | 0.388 | 1.535 | 56.1 | 28.331 |
| S8 | | 40.027 | 0.183 | | | |
| S9 | Fifth Lens | 27.861 | 0.252 | 1.640 | 23.5 | 625.797 |
| S10 | | 29.819 | 0.199 | | | |
| S11 | Sixth Lens | −4.379 | 0.250 | 1.640 | 23.5 | −19.282 |
| S12 | | −6.907 | 0.172 | | | |
| S13 | Seventh Lens | 6.573 | 0.450 | 1.567 | 38.0 | 15.983 |
| S14 | | 22.931 | 0.592 | | | |
| S15 | Eighth Lens | 3.909 | 0.500 | 1.544 | 56.1 | 10.211 |
| S16 | | 12.471 | 0.871 | | | |
| S17 | Ninth Lens | −7.253 | 0.500 | 1.535 | 56.1 | −4.346 |
| S18 | | 3.525 | 0.163 | | | |
| S19 | Filter | Infinity | 0.110 | 1.518 | 64.2 | |
| S20 | | Infinity | 0.760 | | | |
| S21 | Imaging Plane | Infinity | | | | |

Meanwhile, an overall focal length f of the optical imaging system according to the fifth example embodiment may be 6 mm, Fno thereof may be 2.1, and IMG HT thereof may be 6 mm.

In the fifth example embodiment, the first lens 510 may have positive refractive power, and a first surface thereof may be convex while a second surface thereof may be concave.

The second lens 520 may have negative refractive power, and a first surface thereof may be convex while a second surface thereof may be concave.

The third lens 530 may have negative refractive power, and a first surface thereof may be convex while a second surface thereof may be concave.

The fourth lens 540 may have positive refractive power, and a first surface thereof may be convex while a second surface thereof may be concave.

The fifth lens 550 may have positive refractive power, and a first surface thereof may be convex in the paraxial region and a second surface thereof may be concave in the paraxial region.

In addition, at least one inflection point may be formed on at least one of the first and second surfaces of the fifth lens 550. For example, the first surface of the fifth lens 550 may be convex in the paraxial region and concave in a portion other than the paraxial region. The second surface of the fifth lens 550 may be concave in the paraxial region and convex in a portion other than the paraxial region.

The sixth lens 560 may have negative refractive power, and a first surface thereof may be concave in the paraxial region and a second surface thereof may be convex in the paraxial region.

In addition, at least one inflection point may be formed on at least one of the first and second surfaces of the sixth lens 560. For example, the first surface of the sixth lens 560 may be concave in the paraxial region and convex in a portion other than the paraxial region. The second surface of the sixth lens 560 may be convex in the paraxial region and concave in a portion other than the paraxial region.

The seventh lens 570 may have positive refractive power, and a first surface thereof may be convex in the paraxial region and a second surface thereof may be concave in the paraxial region.

In addition, at least one inflection point may be formed on at least one of the first and second surfaces of the seventh lens 570. For example, the first surface of the seventh lens 570 may be convex in the paraxial region and concave in a portion other than the paraxial region. The second surface of the seventh lens 570 may be concave in the paraxial region and convex in a portion other than the paraxial region.

The eighth lens 580 may have positive refractive power, and a first surface thereof may be convex in the paraxial region and a second surface thereof may be concave in the paraxial region.

In addition, at least one inflection point may be formed on at least one of the first and second surfaces of the eighth lens 580. For example, the first surface of the eighth lens 580 may be convex in the paraxial region and concave in a portion other than the paraxial region. The second surface of the eighth lens 580 may be concave in the paraxial region and convex in a portion other than the paraxial region.

The ninth lens 590 may have negative refractive power, and a first surface and a second surface thereof may be concave in the paraxial region.

In addition, at least one inflection point may be formed on at least one of the first and second surfaces of the ninth lens 590. For example, the first surface of the ninth lens 590 may be concave in the paraxial region and convex in a portion other than the paraxial region. The second surface of the ninth lens 590 may be concave in the paraxial region and convex in a portion other than the paraxial region.

Meanwhile, respective surfaces of the first to ninth lenses 510 to 590 may have aspherical coefficients as represented in Table 10. For example, all of object-side surfaces and image-side surfaces of the first to ninth lenses 510 to 590 may be aspherical.

TABLE 10

|   | S1 | S2 | S3 | S4 | S5 | S6 |
|---|---|---|---|---|---|---|
| K | −3.253E−01 | −4.634E+01 | 9.900E+01 | 3.393E+01 | −6.408E+00 | −7.115E+00 |
| A | −4.884E−02 | −3.922E−03 | −4.248E−02 | 6.378E−02 | −8.250E−04 | −4.973E−03 |
| B | 4.347E−01 | 7.470E−03 | 4.862E−01 | −5.437E−01 | −2.806E−02 | 1.295E−01 |
| C | −2.225E+00 | −2.102E−02 | −2.932E+00 | 3.404E+00 | 3.481E−02 | −1.101E+00 |
| D | 7.249E+00 | 3.453E−02 | 1.129E+01 | −1.426E+01 | −1.487E−01 | 5.513E+00 |
| E | −1.598E+01 | −3.271E−02 | −2.943E+01 | 4.089E+01 | 5.186E−01 | −1.863E+01 |
| F | 2.477E+01 | 1.922E−02 | 5.396E+01 | −8.295E+01 | −9.819E−01 | 4.509E+01 |
| G | −2.759E+01 | −7.424E−03 | −7.123E+01 | 1.218E+02 | 1.148E+00 | −8.023E+01 |
| H | 2.234E+01 | 1.954E−03 | 6.847E+01 | −1.308E+02 | −8.855E+02 | 1.062E+02 |
| J | −1.316E+01 | −3.571E−04 | −4.796E+01 | 1.028E+02 | 4.634E−01 | −1.046E+02 |
| L | 5.572E+00 | 4.533E−05 | 2.420E+01 | −5.852E+01 | −1.654E−01 | 7.555E+01 |
| M | −1.653E+00 | −3.926E−06 | −8.568E+00 | 2.347E+01 | 3.967E−02 | −3.883E+01 |
| N | 3.257E−01 | 2.213E−07 | 2.018E+00 | −6.288E+00 | −6.116E−03 | 1.342E+01 |
| O | −3.829E−02 | −7.326E−09 | −2.839E−01 | 1.011E+00 | 5.477E−04 | −2.786E+00 |
| P | 2.031E−03 | 1.081E−10 | 1.804E−02 | −7.370E−02 | −2.166E−05 | 2.622E−01 |

|   | S7 | S8 | S9 | S10 | S11 | S12 |
|---|---|---|---|---|---|---|
| K | 4.576E+01 | 4.049E+01 | −9.900E+01 | 2.874E+01 | −5.060E+00 | 5.996E+00 |
| A | 6.419E−02 | −1.955E−01 | −9.820E−02 | −1.045E−01 | −7.488E−02 | −3.980E−02 |
| B | −1.132E+00 | 1.798E+00 | 2.519E−01 | 3.645E−01 | 5.534E−01 | 2.999E−01 |
| C | 8.798E+00 | −1.105E+01 | −6.181E−01 | −8.953E−01 | −1.612E+00 | −8.837E−01 |
| D | −4.282E+01 | 4.383E+01 | 7.510E−01 | 1.442E+00 | 3.125E+00 | 1.654E+00 |
| E | 1.388E+02 | −1.188E+02 | 2.035E−02 | −1.692E+00 | −4.465E+00 | −2.232E+00 |
| F | −3.127E+02 | 2.275E+02 | −1.752E+00 | 1.515E+00 | 4.783E+00 | 2.225E+00 |
| G | 5.025E+02 | −3.140E+02 | 3.360E+00 | −1.047E+00 | −3.826E+00 | −1.641E+00 |
| H | −5.832E+02 | 3.155E+02 | −3.639E+00 | 5.546E−01 | 2.273E+00 | 8.920E−01 |
| J | 4.895E+02 | −2.308E+02 | 2.606E+00 | −2.209E−01 | −9.929E−01 | −3.548E−01 |
| L | −2.939E+02 | 1.215E+02 | −1.278E+00 | 6.434E−02 | 3.140E−01 | 1.017E−01 |
| M | 1.230E+02 | −4.478E+01 | 4.246E−01 | −1.320E−02 | −6.977E−02 | −2.037E−02 |

TABLE 10-continued

| | | | | | | |
|---|---|---|---|---|---|---|
| N | −3.400E+01 | 1.096E+01 | −9.147E−02 | 1.795E−03 | 1.031E−02 | 2.703E−03 |
| O | 5.578E+00 | −1.599E+00 | 1.152E−02 | −1.447E−04 | −9.088E−04 | −2.129E−04 |
| P | −4.108E−01 | 1.052E−01 | −6.434E−04 | 5.222E−06 | 3.609E−05 | 7.526E−06 |

| | S13 | S14 | S15 | S16 | S17 | S18 |
|---|---|---|---|---|---|---|
| K | 2.996E+00 | 8.178E+01 | 2.929E−01 | 1.105E+01 | 4.802E−01 | −1.604E+00 |
| A | −2.349E−02 | −3.135E−02 | −1.506E−02 | 1.243E−02 | −8.788E−02 | −9.440E−02 |
| B | −4.870E−02 | −2.033E−02 | −4.559E−02 | −4.710E−02 | 1.630E−02 | 3.487E−02 |
| C | 1.599E−01 | 2.906E−02 | 4.084E−02 | 3.519E−02 | 7.706E−03 | −9.085E−03 |
| D | −3.606E−01 | −1.276E−02 | −2.429E−02 | −1.764E−02 | −5.461E−03 | 1.773E−03 |
| E | 5.463E−01 | −5.482E−03 | 1.027E−02 | 6.520E−03 | 1.697E−03 | −2.666E−04 |
| F | −5.720E−01 | 9.752E−03 | −3.187E−03 | −1.858E−03 | −3.322E−04 | 3.074E−05 |
| G | 4.230E−01 | −5.602E−03 | 7.089E−04 | 4.122E−04 | 4.468E−05 | −2.652E−06 |
| H | −2.234E−01 | 1.827E−03 | −1.034E−04 | −6.993E−05 | −4.266E−06 | 1.643E−07 |
| J | 8.443E−02 | −3.648E−04 | 7.620E−06 | 8.819E−06 | 2.924E−07 | −6.800E−09 |
| L | −2.261E−02 | 4.199E−05 | 2.284E−07 | −8.029E−07 | −1.430E−08 | 1.566E−10 |
| M | 4.185E−03 | −1.840E−06 | −1.112E−07 | 5.090E−08 | 4.876E−10 | −2.259E−13 |
| N | −5.085E−04 | −1.521E−07 | 1.092E−08 | −2.124E−09 | −1.101E−11 | −9.549E−14 |
| O | 3.646E−05 | 2.299E−08 | −5.011E−10 | 5.230E−11 | 1.481E−13 | 2.464E−15 |
| P | −1.168E−06 | −8.555E−10 | 9.254E−12 | −5.749E−13 | −8.976E−16 | −2.112E−17 |

Figure 11:
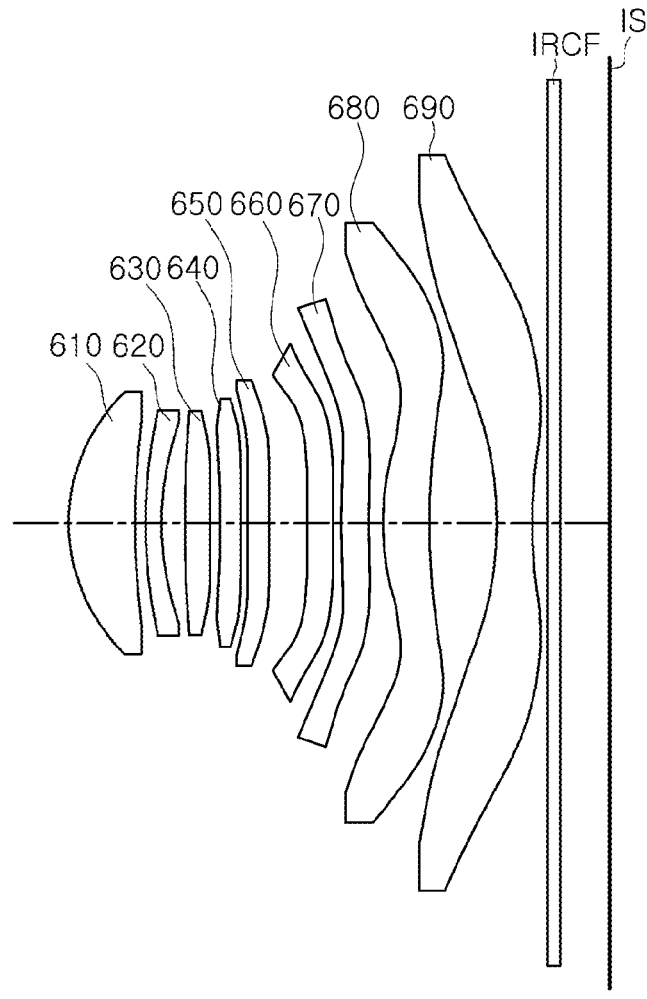
FIG. 11 is a view illustrating an optical imaging system according to a sixth example embodiment in the present disclosure.
Figure 12:
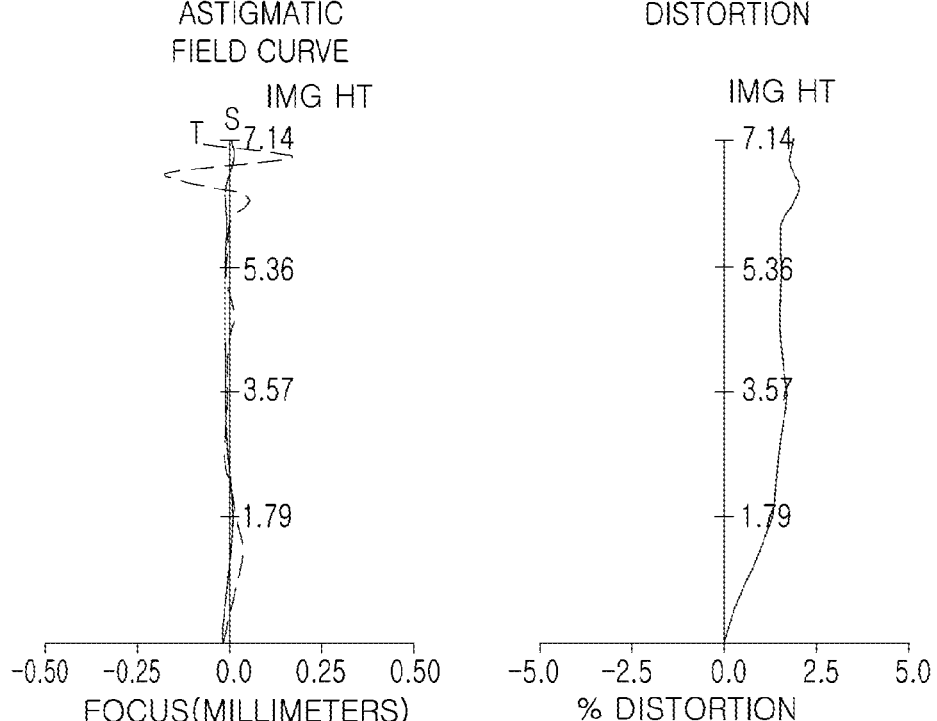
FIG. 12 presents graphs having curves representing aberration characteristics of the optical imaging system illustrated in FIG. 11.

An optical imaging system according to a sixth example embodiment in the present disclosure will be described with reference to FIGS. 11 and 12.

The optical imaging system according to the sixth example embodiment may include a first lens 610, a second lens 620, a third lens 630, a fourth lens 640, a fifth lens 650, a sixth lens 660, a seventh lens 670, an eighth lens 680, and a ninth lens 690, and may further include a stop, a filter IRCF, and an image sensor IS.

Characteristics (radii of curvature, thicknesses of lenses or distances between the lenses, refractive indices, Abbe numbers, and focal lengths) of each lens are represented in Table 11.

TABLE 11

| Surface No. | Remark | Radius of Curvature | Thickness or Distance | Refractive Index | Abbe Number | Focal Length |
|---|---|---|---|---|---|---|
| S1 | First Lens | 2.755 | 1.032 | 1.544 | 56.1 | 6.831 |
| S2 | | 9.161 | 0.180 | | | |
| S3 | Second Lens | 11.929 | 0.250 | 1.671 | 19.4 | −20.663 |
| S4 | | 6.384 | 0.382 | | | |
| S5 | Third Lens | 24.732 | 0.356 | 1.535 | 56.1 | 63.208 |
| S6 | | 90.859 | 0.178 | | | |
| S7 | Fourth Lens | −154.613 | 0.300 | 1.671 | 19.4 | −51.288 |
| S8 | | 44.808 | 0.106 | | | |
| S9 | Fifth Lens | 13.249 | 0.355 | 1.567 | 38.0 | 54.441 |
| S10 | | 23.037 | 0.606 | | | |
| S11 | Sixth Lens | 43.330 | 0.400 | 1.615 | 25.9 | −14.028 |
| S12 | | 7.218 | 0.113 | | | |
| S13 | Seventh Lens | 6.450 | 0.450 | 1.535 | 56.1 | 41.212 |
| S14 | | 8.884 | 0.209 | | | |
| S15 | Eighth Lens | 3.158 | 0.702 | 1.567 | 38.0 | 6.636 |
| S16 | | 17.640 | 1.115 | | | |
| S17 | Ninth Lens | −21.611 | 0.520 | 1.535 | 56.1 | −5.503 |
| S18 | | 3.449 | 0.250 | | | |
| S19 | Filter | Infinity | 0.210 | 1.518 | 64.2 | |
| S20 | | Infinity | 0.776 | | | |
| S21 | Imaging Plane | Infinity | | | | |

Meanwhile, an overall focal length f of the optical imaging system according to the sixth example embodiment may be 7.15 mm, Fno thereof may be 1.9, and IMG HT thereof may be 7.15 mm.

In the sixth example embodiment, the first lens 610 may have positive refractive power, and a first surface thereof may be convex while a second surface thereof may be concave.

The second lens 620 may have negative refractive power, and a first surface thereof may be convex while a second surface thereof may be concave.

The third lens 630 may have positive refractive power, and a first surface thereof may be convex while a second surface thereof may be concave.

The fourth lens 640 may have negative refractive power, and a first surface and a second surface thereof may be concave.

The fifth lens 650 may have positive refractive power, and a first surface thereof may be convex in the paraxial region and a second surface thereof may be concave in the paraxial region.

In addition, at least one inflection point may be formed on at least one of the first and second surfaces of the fifth lens 650. For example, the first surface of the fifth lens 650 may be convex in the paraxial region and concave in a portion other than the paraxial region. The second surface of the fifth lens 650 may be concave in the paraxial region and convex in a portion other than the paraxial region.

The sixth lens 660 may have negative refractive power, and a first surface thereof may be convex in the paraxial region and a second surface thereof may be concave in the paraxial region.

In addition, at least one inflection point may be formed on at least one of the first and second surfaces of the sixth lens 660. For example, the first surface of the sixth lens 660 may be convex in the paraxial region and concave in a portion other than the paraxial region. The second surface of the sixth lens 660 may be concave in the paraxial region and convex in a portion other than the paraxial region.

The seventh lens 670 may have positive refractive power, and a first surface thereof may be convex in the paraxial region and a second surface thereof may be concave in the paraxial region.

In addition, at least one inflection point may be formed on at least one of the first and second surfaces of the seventh lens 670. For example, the first surface of the seventh lens 670 may be convex in the paraxial region and concave in a portion other than the paraxial region. The second surface of the seventh lens 670 may be concave in the paraxial region and convex in a portion other than the paraxial region.

The eighth lens 680 may have positive refractive power, and a first surface thereof may be convex in the paraxial region and a second surface thereof may be concave in the paraxial region.

In addition, at least one inflection point may be formed on at least one of the first and second surfaces of the eighth lens 680. For example, the first surface of the eighth lens 680 may be convex in the paraxial region and concave in a portion other than the paraxial region. The second surface of the eighth lens 680 may be concave in the paraxial region and convex in a portion other than the paraxial region.

The ninth lens 690 may have negative refractive power, and a first surface and a second surface thereof may be concave in the paraxial region.

In addition, at least one inflection point may be formed on at least one of the first and second surfaces of the ninth lens 690. For example, the first surface of the ninth lens 690 may be concave in the paraxial region and convex in a portion other than the paraxial region. The second surface of the ninth lens 690 may be concave in the paraxial region and convex in a portion other than the paraxial region.

Meanwhile, respective surfaces of the first to ninth lenses 610 to 690 may have aspherical coefficients as represented in Table 12. For example, all of object-side surfaces and image-side surfaces of the first to ninth lenses 610 to 690 may be aspherical.

TABLE 12

|   | S1 | S2 | S3 | S4 | S5 | S6 |
|---|---|---|---|---|---|---|
| K | −1.004E+00 | 6.898E+00 | 3.170E+01 | 6.527E+00 | 9.900E+01 | 9.255E+01 |
| A | 3.762E−03 | −1.142E−02 | −1.590E−02 | −6.366E−03 | −7.936E−03 | −1.305E−02 |
| B | 1.442E−02 | 4.251E−03 | −4.068E−03 | −2.491E−02 | −4.058E−02 | −1.201E−02 |
| C | −4.387E−02 | 3.785E−04 | 7.261E−02 | 2.237E−01 | 2.001E−01 | 7.983E−02 |
| D | 8.668E−02 | −1.566E−02 | −2.235E−01 | −8.821E−01 | −6.339E−01 | −3.069E−01 |
| E | −1.155E−01 | 4.099E−02 | 4.337E−01 | 2.272E+00 | 1.351E+00 | 7.102E−01 |
| F | 1.079E−01 | −5.772E−02 | −5.746E−01 | −4.036E+00 | −2.013E+00 | −1.079E+00 |
| G | −7.242E−02 | 5.190E−02 | 5.352E−01 | 5.071E+00 | 2.142E+00 | 1.126E+00 |
| H | 3.521E−02 | −3.177E−02 | −3.557E−01 | −4.567E+00 | −1.646E+00 | −8.268E−01 |
| J | −1.240E−02 | 1.359E−02 | 1.693E−01 | 2.956E+00 | 9.139E−01 | 4.304E−01 |
| L | 3.127E−03 | −4.076E−03 | −5.721E−02 | −1.362E+00 | −3.626E−01 | −1.578E−01 |
| M | −5.498E−04 | 8.415E−04 | 1.338E−02 | 4.360E−01 | 1.000E−01 | 3.979E−02 |
| N | 6.391E−05 | −1.141E−04 | −2.059E−03 | −9.202E−02 | −1.820E−02 | −6.560E−03 |
| O | −4.411E−06 | 9.145E−06 | 1.872E−04 | 1.152E−02 | 1.959E−03 | 6.356E−04 |
| P | 1.368E−07 | −3.288E−07 | −7.610E−06 | −6.470E−04 | −9.435E−05 | −2.742E−05 |

|   | S7 | S8 | S9 | S10 | S11 | S12 |
|---|---|---|---|---|---|---|
| K | 9.900E+01 | −9.380E+00 | −1.193E+01 | −1.116E+01 | −9.795E+01 | −6.702E−01 |
| A | −1.738E−02 | −2.363E−02 | −4.197E−02 | −2.701E−02 | −5.954E−02 | −1.213E−01 |
| B | 5.003E−02 | 2.702E−02 | 4.469E−02 | 1.243E−02 | 5.591E−02 | 1.367E−01 |
| C | −2.041E−01 | −1.554E−02 | −6.048E−02 | 1.263E−03 | −4.694E−02 | −1.539E−01 |
| D | 5.419E−01 | −6.746E−02 | 3.815E−02 | −3.319E−02 | 2.467E−02 | 1.217E−01 |
| E | −1.009E+00 | 1.985E−01 | 7.013E−03 | 5.553E−02 | −3.197E−03 | −6.531E−02 |
| F | 1.342E+00 | −2.789E−01 | −3.461E−02 | −5.180E−02 | −6.372E−03 | 2.422E−02 |
| G | −1.293E+00 | 2.489E−01 | 3.177E−02 | 3.206E−02 | 5.828E−03 | −6.370E−03 |
| H | 9.061E−01 | −1.524E−01 | −1.638E−02 | −1.392E−02 | −2.708E−03 | 1.220E−03 |
| J | −4.614E−01 | 6.566E−02 | 5.286E−03 | 4.325E−03 | 8.104E−04 | −1.748E−04 |
| L | 1.686E−01 | −1.991E−02 | −1.059E−03 | −9.620E−04 | −1.649E−04 | 1.912E−05 |
| M | −4.299E−02 | 4.163E−03 | 1.187E−04 | 1.505E−04 | 2.278E−05 | −1.594E−06 |

TABLE 12-continued

| | | | | | | |
|---|---|---|---|---|---|---|
| N | 7.257E-03 | -5.710E-04 | -4.568E-06 | -1.583E-05 | -2.050E-06 | 9.644E-08 |
| O | -7.274E-04 | 4.625E-05 | -3.684E-07 | 1.007E-06 | 1.083E-07 | -3.728E-09 |
| P | 3.274E-05 | -1.676E-06 | 3.279E-08 | -2.932E-08 | -2.547E-09 | 6.772E-11 |

| | S13 | S14 | S15 | S16 | S17 | S18 |
|---|---|---|---|---|---|---|
| K | -1.370E+00 | 1.154E+00 | -9.996E-01 | 6.915E+00 | 9.160E+00 | -8.984E-01 |
| A | -7.617E-02 | -4.172E-02 | -2.062E-02 | 2.725E-02 | -4.920E-02 | -5.635E-02 |
| B | 1.093E-01 | 2.531E-02 | 5.615E-04 | -1.120E-02 | 1.092E-02 | 1.353E-02 |
| C | -1.419E-01 | -3.001E-02 | -8.957E-04 | 3.541E-03 | -1.269E-03 | -2.555E-03 |
| D | 1.128E-01 | 2.152E-02 | 6.942E-04 | -1.136E-03 | 2.399E-04 | 3.445E-04 |
| E | -5.808E-02 | -9.445E-03 | -3.060E-04 | 2.906E-04 | -6.030E-05 | -2.874E-05 |
| F | 2.035E-02 | 2.745E-03 | 8.000E-05 | -5.379E-05 | 9.774E-06 | 8.323E-07 |
| G | -5.017E-03 | -5.526E-04 | -1.307E-05 | 7.166E-06 | -9.918E-07 | 1.058E-07 |
| H | 8.856E-04 | 7.894E-05 | 1.396E-06 | -6.938E-07 | 6.668E-08 | -1.545E-08 |
| J | -1.126E-04 | -8.071E-06 | -9.997E-08 | 4.895E-08 | -3.072E-09 | 1.016E-09 |
| L | 1.025E-05 | 5.871E-07 | 4.793E-09 | -2.491E-09 | 9.788E-11 | -4.088E-11 |
| M | -6.515E-07 | -2.969E-08 | -1.495E-10 | 8.894E-11 | -2.125E-12 | 1.060E-12 |
| N | 2.752E-08 | 9.926E-10 | 2.822E-12 | -2.110E-12 | 3.003E-14 | -1.734E-14 |
| O | -6.947E-10 | -1.973E-11 | -2.715E-14 | 2.983E-14 | -2.493E-16 | 1.632E-16 |
| P | 7.936E-12 | 1.764E-13 | 7.762E-17 | -1.896E-16 | 9.223E-19 | -6.749E-19 |

Table 13 represents values of Conditional Expressions of the optical imaging system according to each example embodiment.

TABLE 13

| Conditional Expression | First Example embodiment | Second Example embodiment | Third Example embodiment | Fourth Example embodiment | Fifth Example embodiment | Sixth Example embodiment |
|---|---|---|---|---|---|---|
| TTL/(2*IMG HT) < 0.61 | 0.59 | 0.59 | 0.58 | 0.58 | 0.58 | 0.59 |
| TTL/ΣCT < 2 | 1.943 | 1.929 | 1.876 | 1.779 | 1.992 | 1.945 |
| 0.6 < f/f1 < 1.5 | 1.041 | 1.024 | 1.026 | 0.860 | 1.037 | 1.047 |
| v1 – v2 > 30 | 36.70 | 36.70 | 32.60 | 36.70 | 32.60 | 36.70 |
| 1.0 < TTL/f < 1.25 | 1.19 | 1.20 | 1.19 | 1.23 | 1.17 | 1.19 |
| n2 + n3 > 3.15 | 3.21 | 3.21 | 3.32 | 3.33 | 3.32 | 3.21 |
| 0.15 < BFL/f < 0.25 | 0.172 | 0.168 | 0.175 | 0.174 | 0.172 | 0.173 |
| 0.001 < D1/f <0.04 | 0.022 | 0.017 | 0.021 | 0.015 | 0.024 | 0.025 |
| 0.30 < R1/f < 0.40 | 0.386 | 0.388 | 0.388 | 0.381 | 0.385 | 0.385 |
| Fno < 2.3 | 1.95 | 1.95 | 2.00 | 2.10 | 2.10 | 1.90 |
| f1/|f2| < 0.34 | 0.324 | 0.317 | 0.121 | 0.282 | 0.062 | 0.331 |

As set forth above, the optical imaging system according to the example embodiment in the present disclosure may realize a high resolution and have a reduced size.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens having positive refractive power, a fourth lens having positive refractive power, a fifth lens having negative refractive power, a sixth lens, a seventh lens having positive refractive power, a convex object-side surface in a paraxial region thereof, and a concave image-side surface in a paraxial region thereof, an eighth lens, and a ninth lens sequentially arranged from an object side, wherein the first lens has positive refractive power, wherein the second lens has negative refractive power and a refractive index higher than 1.6, wherein any one of the third lens and the fourth lens has a refractive index higher than 1.6, wherein the sixth lens has negative refractive power and a refractive index higher than 1.6, wherein TTL/(2*IMG HT)<0.61, where TTL is a distance on an optical axis from an object-side surface of the first lens to an imaging plane, and IMG HT is half a diagonal length of the imaging plane, and wherein f1/|f2|<0.34, where f1 is a focal length of the first lens, and f2 is a focal length of the second lens.

2. The optical imaging system of claim 1, wherein TTL/ΣCT<2, where ΣCT is a sum of thicknesses on the optical axis of the first to ninth lenses.

3. The optical imaging system of claim 1, wherein 0.6<f/f1<1.5, where f is an overall focal length of the optical imaging system, and f1 is a focal length of the first lens.

4. The optical imaging system of claim 1, wherein v1−v2>30, where v1 is an Abbe number of the first lens, and v2 is an Abbe number of the second lens.

5. The optical imaging system of claim 1, wherein 1<TTL/f<1.25, where f is an overall focal length of the optical imaging system.

6. The optical imaging system of claim 1, wherein n2+n3>3.15, where n2 is a refractive index of the second lens, and n3 is a refractive index of the third lens.

7. The optical imaging system of claim 1, wherein 0.15<BFL/f<0.25, where f is an overall focal length of the optical imaging system, and BFL is a distance on the optical axis from an image-side surface of the ninth lens to the imaging plane.

8. The optical imaging system of claim 1, wherein 0.001<D1/f<0.04, where D1 is a distance on the optical axis between an image-side surface of the first lens and an object-side surface of the second lens, and f is an overall focal length of the optical imaging system.

9. The optical imaging system of claim 1, wherein 0.3<R1/f<0.4, where R1 is a radius of curvature of the object-side surface of the first lens, and f is an overall focal length of the optical imaging system.

10. The optical imaging system of claim 1, wherein Fno<2.3, where Fno is an f-number of the optical imaging system.

11. The optical imaging system of claim 1, wherein the eighth lens has positive refractive power and the ninth lens has negative refractive power.

12. An optical imaging system comprising:

a first lens having positive refractive power, a convex object-side surface, and a concave image-side surface;

a second lens having negative refractive power, a convex object-side surface, and a concave image-side surface;

a third lens having positive refractive power, a convex object-side surface, and a concave image-side surface;

a fourth lens having positive refractive power, and a fifth lens having negative refractive power;

a sixth lens having negative refractive power and a refractive index higher than 1.6;

a seventh lens having positive refractive power, a convex object-side surface in a paraxial region thereof, and a concave image-side surface in a paraxial region thereof, and an eighth lens each having positive refractive power; and a ninth lens having negative refractive power, wherein the first to ninth lenses are sequentially arranged from an object side, wherein TTL/ΣCT<2, where TTL is a distance on an optical axis from an object-side surface of the first lens to an imaging plane, and ΣCT is a sum of thicknesses on the optical axis of the first to ninth lenses, and wherein f1/|f2|<0.34, where f1 is a focal length of the first lens, and f2 is a focal length of the second lens.

13. The optical imaging system of claim 12, wherein TTL/(2*IMG HT)<0.61, where IMG HT is half a diagonal length of the imaging plane.

14. The optical imaging system of claim 12, wherein the eighth lens has a convex object-side surface and a concave image-side surface, and wherein the ninth lens has a concave object-side surface and a concave image-side surface.

15. The optical imaging system of claim 12, wherein the second lens, and any one of the third lens and the fourth lens each have a refractive index higher than 1.6.

16. An optical imaging system comprising:

a first lens having positive refractive power;

a second lens having negative refractive power;

a third lens having positive refractive power, a convex object-side surface, and a concave image-side surface;

a fourth lens having positive refractive power, and a fifth lens having negative refractive power;

a sixth lens having negative refractive power and a refractive index higher than 1.6;

a seventh lens and an eighth lens each having positive refractive power, a convex object-side surface, and a concave image-side surface; and a ninth lens having negative refractive power, a concave object-side surface, and a concave image-side surface, wherein the first to ninth lenses are sequentially arranged from an object side, wherein 0.6<f/f1<1.5, where f is an overall focal length of the optical imaging system, and f1 is a focal length of the first lens, and wherein f1/|f2|<0.34, where f2 is a focal length of the second lens.

17. The optical imaging system of claim 16, wherein the second lens, and any one of the third lens and the fourth lens each have a refractive index higher than 1.6.

* * * * *